United States Patent
Filardo et al.

(10) Patent No.: US 11,209,022 B2
(45) Date of Patent: Dec. 28, 2021

(54) VEHICLE WITH TRAVELING WAVE THRUST MODULE APPARATUSES, METHODS AND SYSTEMS

(71) Applicant: Pliant Energy Systems LLC, Brooklyn, NY (US)

(72) Inventors: Benjamin Pietro Filardo, New York, NY (US); Daniel S. Zimmerman, Brooklyn, NY (US); Michael I. Weaker, Brooklyn, NY (US)

(73) Assignee: Pliant Energy Systems LLC, Brooklyn, NY (US)

( * ) Notice: Subject to any disclaimer, the term of this patent is extended or adjusted under 35 U.S.C. 154(b) by 171 days.

(21) Appl. No.: 16/730,649

(22) Filed: Dec. 30, 2019

(65) Prior Publication Data

US 2020/0149555 A1    May 14, 2020

Related U.S. Application Data

(63) Continuation-in-part of application No. 16/167,293, filed on Oct. 22, 2018, now Pat. No. 10,519,926, (Continued)

(51) Int. Cl.
*F03G 7/08* (2006.01)
*H02K 7/18* (2006.01)
(Continued)

(52) U.S. Cl.
CPC .............. *F04D 33/00* (2013.01); *B63H 1/37* (2013.01); *F03B 5/00* (2013.01); *F03D 5/06* (2013.01);
(Continued)

(58) Field of Classification Search
CPC ...... F04D 33/00; F03B 5/00; F05B 2240/311; F05B 2240/40; F05B 2240/97; B63H 1/00; B63H 1/30; B63H 1/37
(Continued)

(56) References Cited

U.S. PATENT DOCUMENTS 2,436,517 A    2/1948    Lewis
3,190,618 A    6/1965    Katzen
(Continued)

FOREIGN PATENT DOCUMENTS

AU    2006203202    2/2007
CA    2554316    1/2007
(Continued)

OTHER PUBLICATIONS

PCT International Search Report and Written Opinion, dated May 8, 2012, for PCT/US12/20836, filed Jan. 10, 2012.
(Continued)

*Primary Examiner* — Tulsidas C Patel
*Assistant Examiner* — Thomas K Quigley
(74) *Attorney, Agent, or Firm* — Irell & Manella, LLC

(57) ABSTRACT

The VEHICLE WITH TRAVELING WAVE THRUST MODULE APPARATUSES, METHODS AND SYSTEMS include force or forces applied to an arc-like flexible sheet-like material to create a deformed crenated strip fin with strained-deformations. The strained-deformations take on a sinusoid-like form that express the internal energy state of the flexible sheet-like material after it has been configured into a crenated strip fin. After being incorporated into a mechanism with couplings that prevent the crenated strip fin from returning to its un-strained state, the strained-deformations persist. Actuators may be used to sequentially rotate vertebrae attached to the fins causing the travel of sinusoid-like deformations along the fins. The fin, fin actuator or actuators, power source and central controller may be incorporated into a thrust module. Two thrust modules couple to each other via roll actuators and flexible coupling members may form a vehicle with exceptional maneuverability.

24 Claims, 24 Drawing Sheets

Related U.S. Application Data which is a continuation-in-part of application No. 15/294,635, filed on Oct. 14, 2016, now Pat. No. 10,190,570.

(60) Provisional application No. 62/357,318, filed on Jun. 30, 2016.

(51) Int. Cl.
*F04D 33/00* (2006.01)
*B63H 1/37* (2006.01)
*F03D 5/06* (2006.01)
*F03B 5/00* (2006.01)

(52) U.S. Cl.
CPC ..... *F05B 2240/311* (2013.01); *F05B 2240/40* (2013.01); *F05B 2240/97* (2013.01)

(58) Field of Classification Search
USPC .................. 440/15, 16; 114/144 R, 312, 337
See application file for complete search history.

(56) References Cited

U.S. PATENT DOCUMENTS

| | | | |
|---|---|---|---|
| 3,467,013 A | 9/1969 | Conner | |
| 3,626,566 A | 12/1971 | Kilgour | |
| 3,816,774 A | 6/1974 | Ohnuki et al. | |
| 3,942,465 A | 3/1976 | Bouix | |
| 3,961,863 A * | 6/1976 | Hooper, III | F04B 43/086 417/334 |
| 4,056,742 A | 11/1977 | Tibbetts | |
| 4,151,424 A | 4/1979 | Bailey | |
| 4,164,383 A | 8/1979 | French | |
| 4,257,640 A | 3/1981 | Wiley | |
| 4,269,906 A | 5/1981 | Schmechtig | |
| 4,310,264 A | 1/1982 | Brownlee | |
| 4,371,788 A | 2/1983 | Smith, Jr. | |
| 4,375,151 A | 3/1983 | French | |
| 4,387,318 A | 6/1983 | Kolm et al. | |
| 4,448,020 A | 5/1984 | Wood et al. | |
| 4,469,596 A | 9/1984 | Kantor | |
| 4,476,397 A | 10/1984 | Lawson | |
| 4,488,854 A | 12/1984 | Miller | |
| 4,498,850 A | 2/1985 | Perlov et al. | |
| 4,558,954 A | 12/1985 | Barr | |
| 4,830,315 A | 5/1989 | Presz, Jr. et al. | |
| 5,152,674 A | 10/1992 | Marx | |
| 5,192,197 A | 3/1993 | Culp | |
| 5,230,656 A | 7/1993 | Paterson et al. | |
| 5,611,666 A * | 3/1997 | Au | B63H 1/37 416/82 |
| 5,820,342 A | 10/1998 | Au et al. | |
| 5,826,535 A | 10/1998 | Shaw | |
| 5,950,726 A | 9/1999 | Roberts | |
| 5,961,289 A | 10/1999 | Lohmann | |
| 5,961,298 A | 10/1999 | Bar-Cohen et al. | |
| 5,975,865 A | 11/1999 | Manabe | |
| 6,069,420 A | 5/2000 | Mizzi et al. | |
| 6,079,214 A | 6/2000 | Bishop | |
| 6,106,249 A | 8/2000 | Barak | |
| 6,109,888 A | 8/2000 | Marshall | |
| 6,153,944 A | 11/2000 | Clark | |
| 6,250,585 B1 | 6/2001 | Pell | |
| 6,327,994 B1 | 12/2001 | Labrador | |
| 6,357,997 B1 | 3/2002 | Rosefsky | |
| 6,361,284 B2 | 3/2002 | Drevet | |
| 6,411,015 B1 | 6/2002 | Toda | |
| 6,424,079 B1 | 7/2002 | Carroll | |
| 6,435,849 B1 | 8/2002 | Guilmette | |
| 6,579,068 B2 | 6/2003 | Bridger et al. | |
| 6,628,040 B2 | 9/2003 | Pelrine et al. | |
| 6,911,764 B2 | 6/2005 | Pelrine et al. | |
| 6,948,910 B2 | 9/2005 | Polacsek | |
| 6,952,058 B2 | 10/2005 | McCoin | |
| 7,034,432 B1 | 4/2006 | Pelrine et al. | |
| 7,064,472 B2 | 6/2006 | Pelrine et al. | |
| 7,148,579 B2 | 12/2006 | Pinkerton et al. | |
| 7,166,952 B2 | 1/2007 | Topliss et al. | |
| 7,196,450 B2 | 3/2007 | Pinkerton et al. | |
| 7,204,731 B2 | 4/2007 | Gusler | |
| 7,229,029 B2 | 6/2007 | Windham | |
| 7,244,151 B2 * | 7/2007 | Gusler | B63H 1/30 440/13 |
| 7,300,323 B1 | 11/2007 | Bandyopadhyay | |
| 7,352,073 B2 | 4/2008 | Ames | |
| 7,357,684 B2 | 4/2008 | Gusler | |
| 7,362,032 B2 | 4/2008 | Pelrine et al. | |
| 7,387,179 B2 * | 6/2008 | Anhalt | B08B 9/045 180/9.1 |
| 7,470,086 B2 | 12/2008 | Jennings et al. | |
| 7,492,054 B2 | 2/2009 | Catlin | |
| 7,493,759 B2 | 2/2009 | Bernitsas et al. | |
| 7,525,212 B1 | 4/2009 | Catlin | |
| 7,573,143 B2 | 8/2009 | Frayne | |
| 7,626,281 B2 | 12/2009 | Kawai | |
| 7,649,276 B2 | 1/2010 | Kornbluh et al. | |
| 7,696,634 B2 | 4/2010 | Filardo | |
| 7,737,608 B2 | 6/2010 | Ruggeri et al. | |
| 7,839,007 B2 | 11/2010 | Filardo | |
| 7,863,768 B2 | 1/2011 | Filardo | |
| 7,872,363 B2 | 1/2011 | Morse | |
| 8,102,072 B2 | 1/2012 | Tsou | |
| 8,120,195 B2 | 2/2012 | Pollack et al. | |
| 8,142,154 B2 | 3/2012 | Gartner | |
| 8,272,839 B2 | 9/2012 | Gartner | |
| 8,426,999 B2 | 4/2013 | Drevet | |
| 8,432,057 B2 | 4/2013 | Filardo | |
| 8,610,304 B2 | 12/2013 | Filardo | |
| 9,297,352 B2 * | 3/2016 | Bellamy | F03B 13/188 |
| 10,487,817 B1 * | 11/2019 | Shan | F04B 43/0054 |
| 2001/0010348 A1 | 8/2001 | Bilanin et al. | |
| 2002/0146333 A1 | 10/2002 | Drevet | |
| 2003/0102411 A1 | 6/2003 | Kota | |
| 2004/0008853 A1 | 1/2004 | Pelrine et al. | |
| 2004/0043677 A1 | 3/2004 | Yamamoto et al. | |
| 2004/0197519 A1 | 10/2004 | Elzey et al. | |
| 2006/0145030 A1 | 7/2006 | Cowan et al. | |
| 2006/0172629 A1 * | 8/2006 | Gusler | B63H 19/00 440/16 |
| 2006/0192389 A1 | 8/2006 | Perry et al. | |
| 2006/0258912 A1 | 11/2006 | Belson et al. | |
| 2007/0031667 A1 | 2/2007 | Hook et al. | |
| 2007/0222344 A1 | 9/2007 | Kornbluh et al. | |
| 2008/0087762 A1 | 4/2008 | Hollman et al. | |
| 2008/0128560 A1 | 6/2008 | Hyde et al. | |
| 2008/0229745 A1 | 9/2008 | Ghouse | |
| 2009/0058095 A1 | 3/2009 | McClintic | |
| 2009/0134623 A1 | 5/2009 | Krouse | |
| 2010/0045036 A1 | 2/2010 | Filardo | |
| 2010/0078941 A1 * | 4/2010 | Filardo | F03B 17/06 290/52 |
| 2010/0084871 A1 | 4/2010 | Filardo | |
| 2010/0133387 A1 | 6/2010 | Wood et al. | |
| 2010/0133848 A1 | 6/2010 | Piasecki | |
| 2010/0295417 A1 | 11/2010 | Wood et al. | |
| 2017/0016424 A1 | 1/2017 | Filardo et al. | |
| 2019/0055917 A1 | 2/2019 | Filardo | |
| 2019/0331090 A1 | 10/2019 | Filardo | |

FOREIGN PATENT DOCUMENTS

| | | |
|---|---|---|
| CN | 103213665 | 7/2013 |
| CN | 104816808 | 8/2015 |
| CN | 111993849 A * | 11/2020 |
| CN | 112406431 A * | 2/2021 |
| DE | 102005046516 | 4/2007 |
| EP | 0322899 | 7/1989 |
| EP | 1219834 | 7/2002 |
| EP | 1783843 | 5/2007 |
| GB | 2081816 | 2/1982 |
| GB | 2129059 | 5/1984 |

(56) References Cited

FOREIGN PATENT DOCUMENTS

| RU | 2347944 | 2/2009 |
|---|---|---|
| WO | WO0202309 | 1/2002 |
| WO | WO07029275 | 3/2007 |

OTHER PUBLICATIONS

Jham, "Anaconda wave-power generator snakes into next stage of production," http://guardian.co.uk.environment/2009/may/06/anaconda-wave-power, May 6, 2009.

"Checkmate Seaenergy are proud to present the Anaconda Wave Energy Converter," Introduction page, http://www.checkmateuk.com/seaenergy/introduction.html, printed on Jun. 4, 2009.

"Checkmate Seaenergy are proud to present the Anaconda Wave Energy Converter," The Anaconda system page, http://www.checkmateuk.com/seaenergy/system.html, printed on Jun. 4, 2009.

"Checkmate Seaenergy are proud to present the Anaconda Wave Energy Converter," Economics page, http:11www.checkmateuk.com/seaenergy/economics.html, printed on Jun. 4, 2009.

"Checkmate Seaenergy are proud to present the Anaconda Wave Energy Converter," Technology page, http://www.checkmateuk.com/seaenergy/technoiogy.html, printed on Jun. 4, 2009.

"Checkmate Seaenergy are proud to present the Anaconda Wave Energy Converter," Wave Energy Potential page, http://www.checkmateuk.com/seaenergy/potential.html, printed on Jun. 4, 2009.

"Checkmate Seaenergy are proud to present the Anaconda Wave Energy Converter," The Anaconda Team page, http://www.checkmateuk.com/seaenergy/team.html, printed on Jun. 4, 2009.

"Checkmate Seaenergy are proud to present the Anaconda Wave Energy Converter," Downloads and Links page, http://www.checkmateuk.com/seaenergy/links.html, printed on Jun. 4, 2009.

"Checkmate Seaenergy are proud to present the Anaconda Wave Energy Converter," Project News page, http://www/checkmateuk.com/seaenergy/news.html, printed on Jun. 4, 2009.

"VIVACE (Vortex Induced Vibrations Aquatic Clean Energy)," Technology page, http://www.vortexhydroenergy.com/html/technology.html, printed on Jun. 10, 2009.

Giles, "Harnessing river whirlpools puts energy on tap," http://www.newscientist.com/article/mg19826516.200-harnessing-river- . . . 1, Apr. 11, 2008, printed on Jun. 10, 2009.

PCT International Search Report and Written Opinion, dated Aug. 1, 2008 for PCT/US08/05605, filed May 1, 2008.

PCT International Search Report and Written Opinion, dated Dec. 24, 2009 for PCT/US09/62257, filed Oct. 27, 2009.

PCT International Search Report and Written Opinion, dated Jan. 27, 2010 for PCT/US09/64241, filed Nov. 12, 2009.

Supplementary European Search Report and European Search Opinion, dated Jun. 20, 2012 for EP Application No. 09847665.8, filed Nov. 12, 2009.

PCT International Search Report and Written Opinion, dated Sep. 11, 2020, for PCT/US19/68995, filed Dec. 30, 2019.

\* cited by examiner

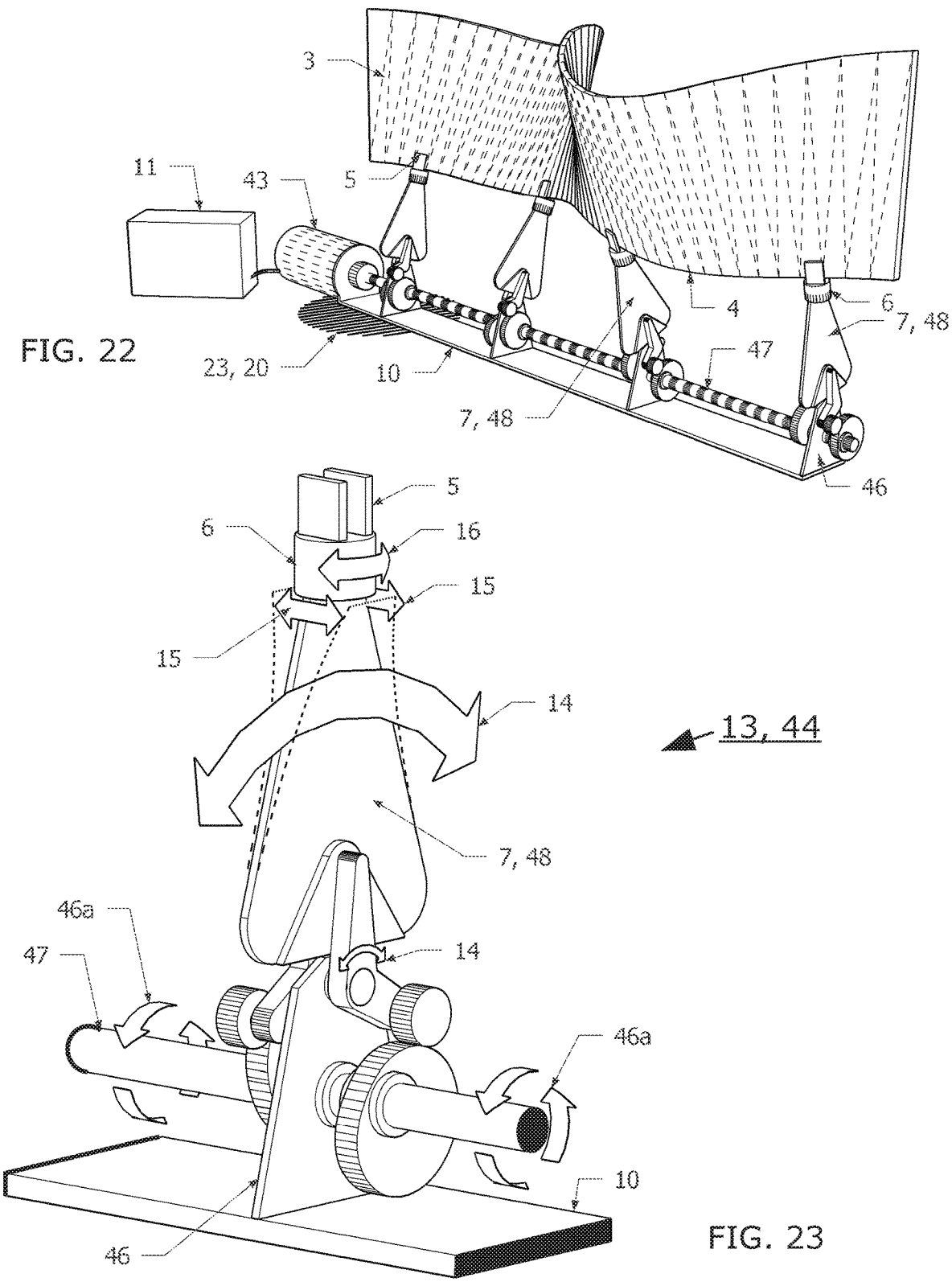

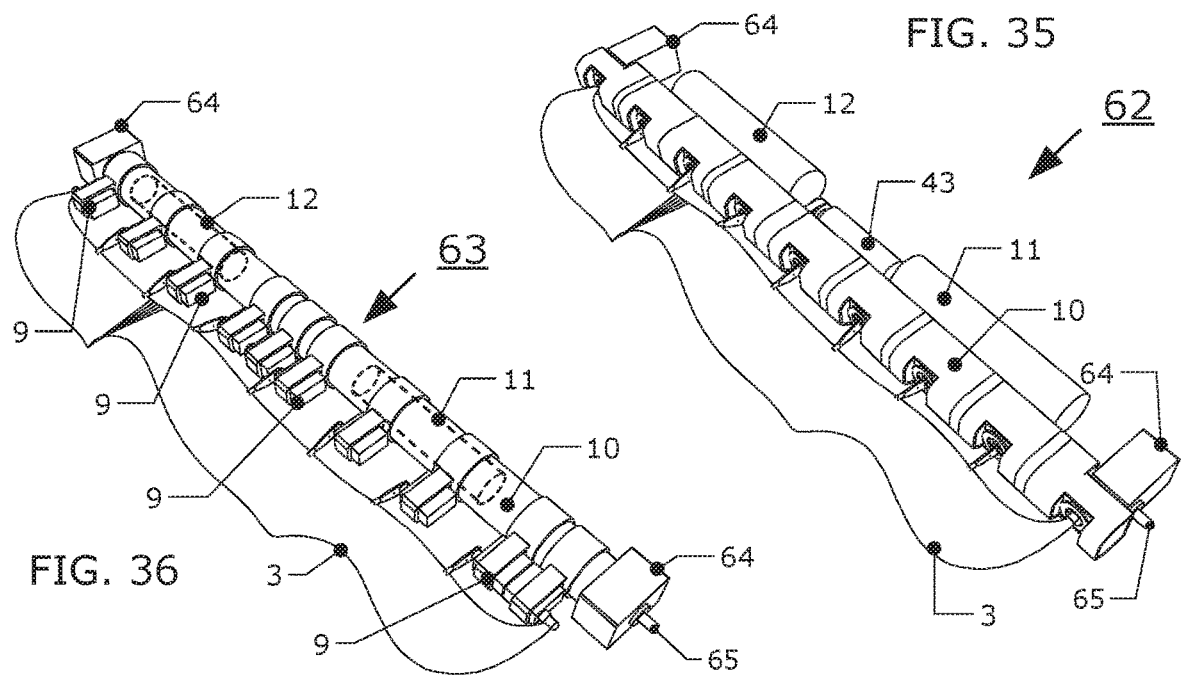
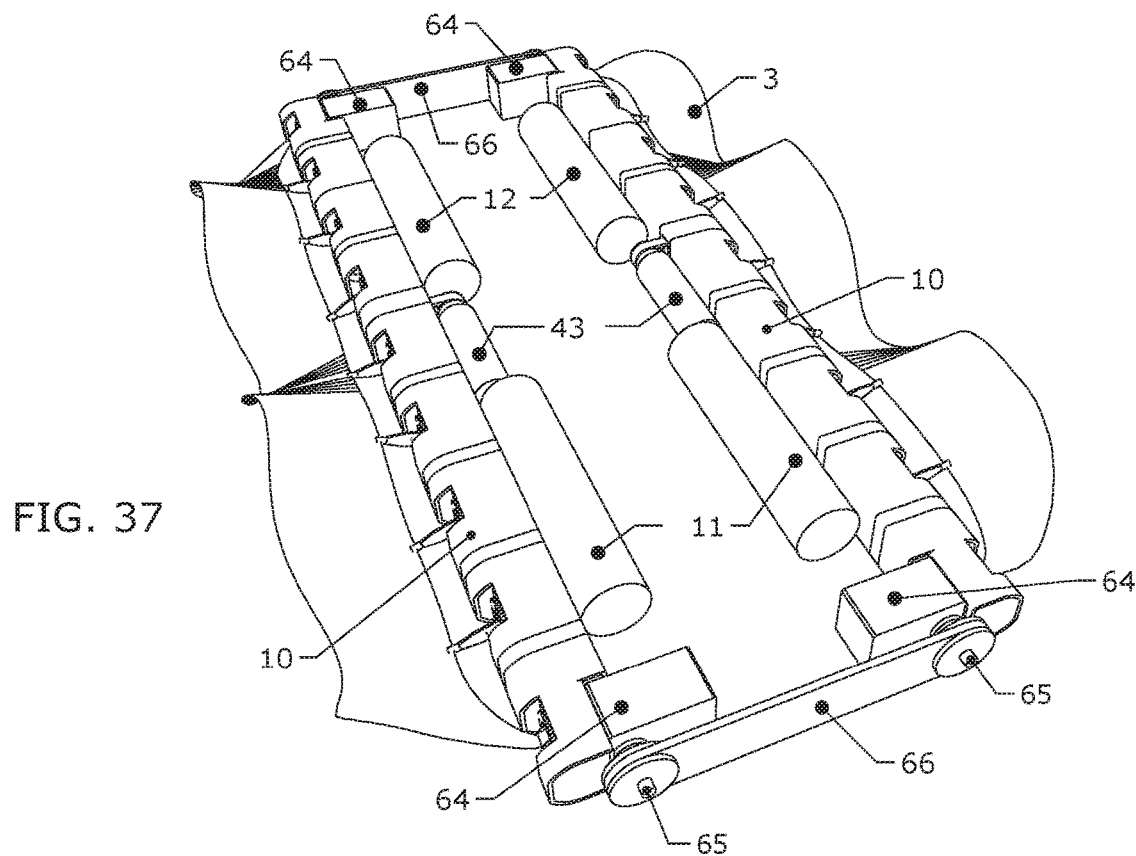

US 11,209,022 B2

VEHICLE WITH TRAVELING WAVE THRUST MODULE APPARATUSES, METHODS AND SYSTEMS

PRIORITY CLAIM

This application is a Continuation-in-Part of and claims priority under 35 U.S.C. § 120 to co-pending U.S. non-provisional patent application Ser. No. 16/167,293 filed Oct. 22, 2018 entitled, "Traveling Wave Propeller, Pump and Generator Apparatuses, Methods and Systems", which in turn claims priority under 35 U.S.C. § 120 to prior U.S. non-provisional patent application Ser. No. 15/294,635 filed Oct. 14, 2016 entitled, "Traveling Wave Propeller, Pump and Generator Apparatuses, Methods and Systems" (now U.S. Pat. No. 10,190,570), which in turn claims priority under 35 U.S.C. § 119 to prior U.S. provisional patent application Ser. No. 62/357,318 filed Jun. 30, 2016 entitled, "Traveling Wave Propeller, Pump and Generator Apparatuses, Methods and Systems". The entire contents of the aforementioned applications are incorporated in their entirety herein by reference.

This invention was made with government support under contract #N00014-16-C-3042 awarded by the Office of Naval Research. The government has certain rights in the invention.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address energy conversion, and more particularly, include VEHICLE WITH TRAVELING WAVE THRUST MODULE APPARATUSES, METHODS AND SYSTEMS.

BACKGROUND

Mechanical devices actuated to perform prescribed motions for a variety of purposes are ubiquitous. Such devices may be configured to effectuate automated movements in or on a variety of media, such as on land, underwater, or in the air. In some cases, sensors may be employed to provide data about device motion, device orientation, environmental factors, and the like. Sensor data may then be used to control actuation of motors to produce the prescribed motions for a particular device configuration or environment,

SUMMARY

Aspects of the disclosed apparatuses, methods and systems include devices which create repetitive or undulating motion, or effect, to produce useful work, such as for a propulsion system or other system, including energy-harnessing systems.

In one embodiment force or forces are applied to an arc-like flexible sheet-like material to create a deformed crenated strip fin with strained-deformations. The strained-deformations take on a sinusoid-like form that express the internal energy state of the flexible sheet-like material after it has been configured into a crenated strip fin. After being incorporated into a mechanism with couplings that prevent the crenated strip fin from returning to its un-strained state, the strained-deformations persist. Actuators may be used to sequentially rotate vertebrae attached to the fins causing the travel of sinusoid-like deformations along the fins. In a fluid medium, the traveling waves of sinusoidal deformations may exert force on the fluid causing the fluid to move and/or creating thrust. In some land-based embodiments, the fins may be configured and the actuators operated to create a crawling action. The fin, fin actuator or actuators, power source and central controller may be incorporated into a thrust module. Two thrust modules couple to each other via roll actuators and flexible coupling members may form a vehicle with exceptional maneuverability. Some examples of applications in various embodiments include propulsion systems for sub-sea vessels, personal propulsion systems attachable to the body of a swimmer or diver, surface vessels, amphibious vehicles, lighter-than-air craft, and the pumping, mixing and transportation of fluids, powders, and aggregates. Components, assemblies and modes of operation described.

Where the actuators are of a type that are capable of harnessing energy, such as electromagnetic motors or dielectric elastomers, the mechanisms may also harness energy when fixed in an environment with moving fluid.

BRIEF DESCRIPTION OF THE DRAWINGS

The accompanying appendices and/or drawings illustrate various non-limiting, example, innovative aspects in accordance with the present descriptions:

FIG. 22 shows an implementation having a cam in one embodiment; and

FIG. 23 shows details of a transmission assembly of an implementation having a cam in one embodiment;

FIGS. 35-36 show implementations of thrust modules in some embodiments;

FIG. 37 shows an implementation of thrust modules coupled via at least one flexible coupling member in one embodiment;

DETAILED DESCRIPTION

Figure 1:
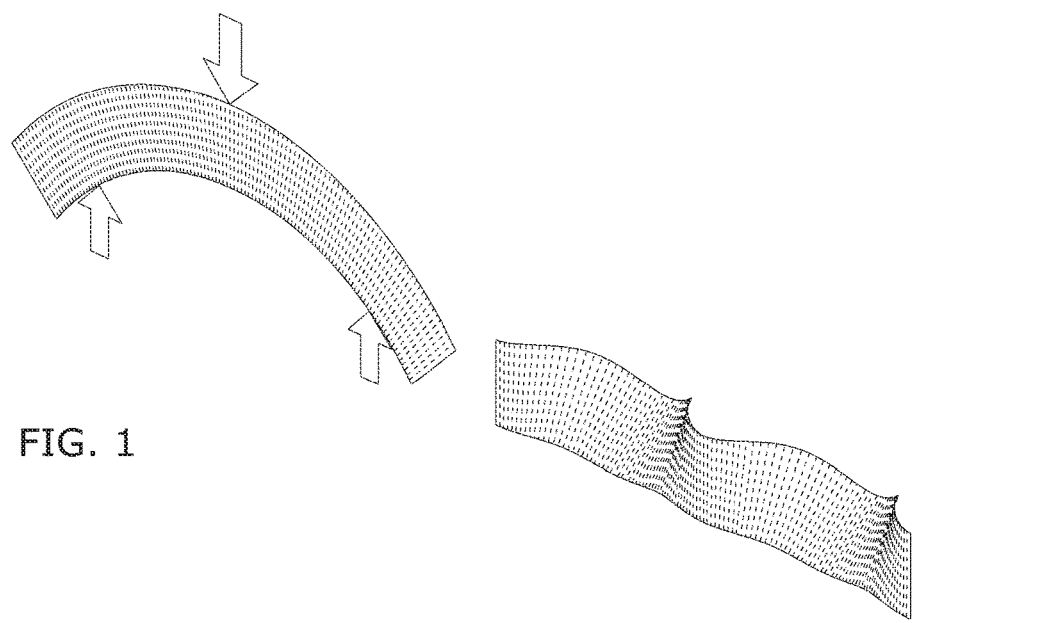
FIG. 1 shows the formation of a crenated strip fin in one embodiment.
Figure 2:
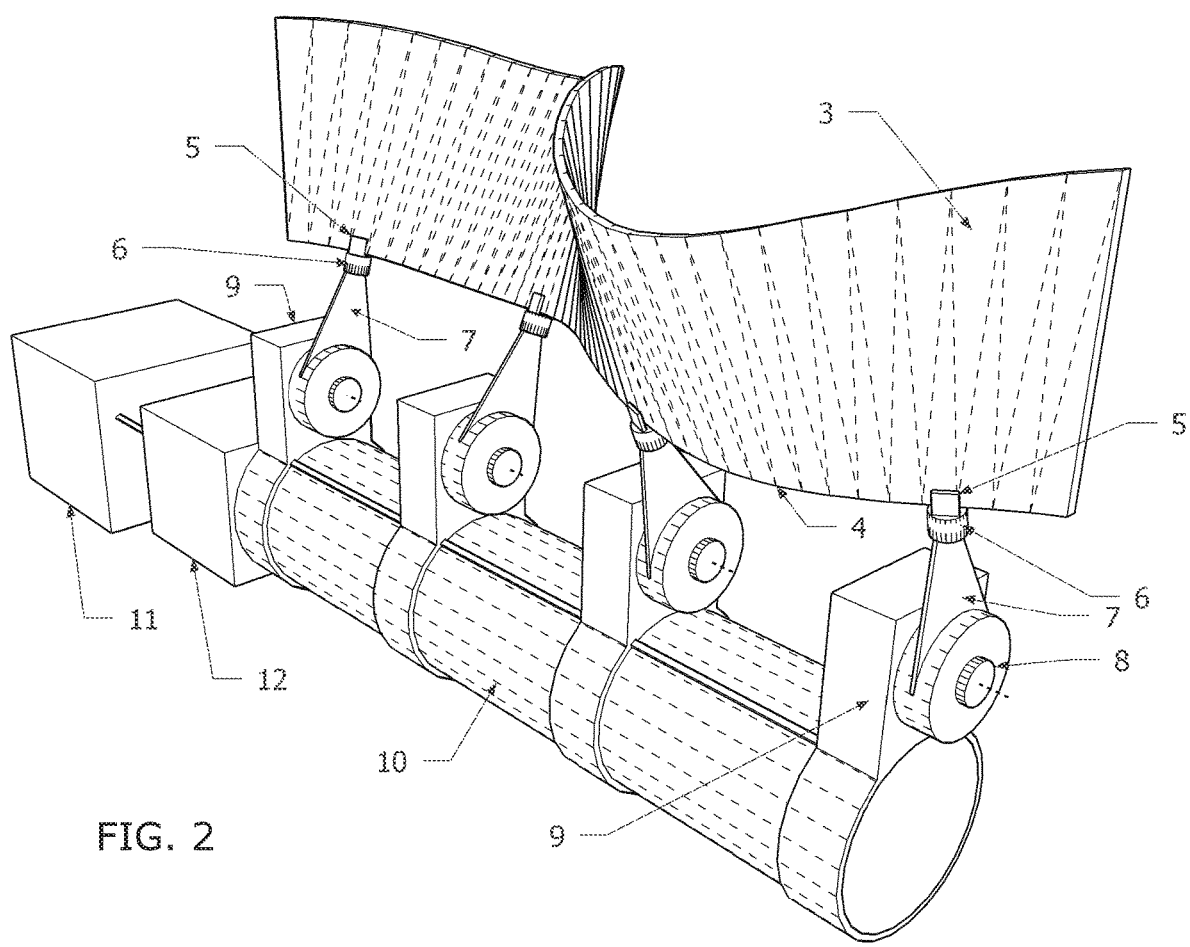
FIG. 2 shows a configuration of a crenated strip fin assembled into a mechanism in one embodiment.

Force or forces 1 are applied to an arc-like flexible sheet-like material 2 to create a deformed crenated strip fin 3 with strained-deformations, FIG. 1. The strained-deformations take on a sinusoid-like form that express the internal energy state of the flexible sheet-like material 2 after it has been configured into a crenated strip fin 3. After being incorporated into a mechanism with couplings 5, 6, 7, 10, FIG. 2 for example, that prevent the crenated strip fin 3 from returning to its un-strained state, the strained-deformations persist.

Figure 3:
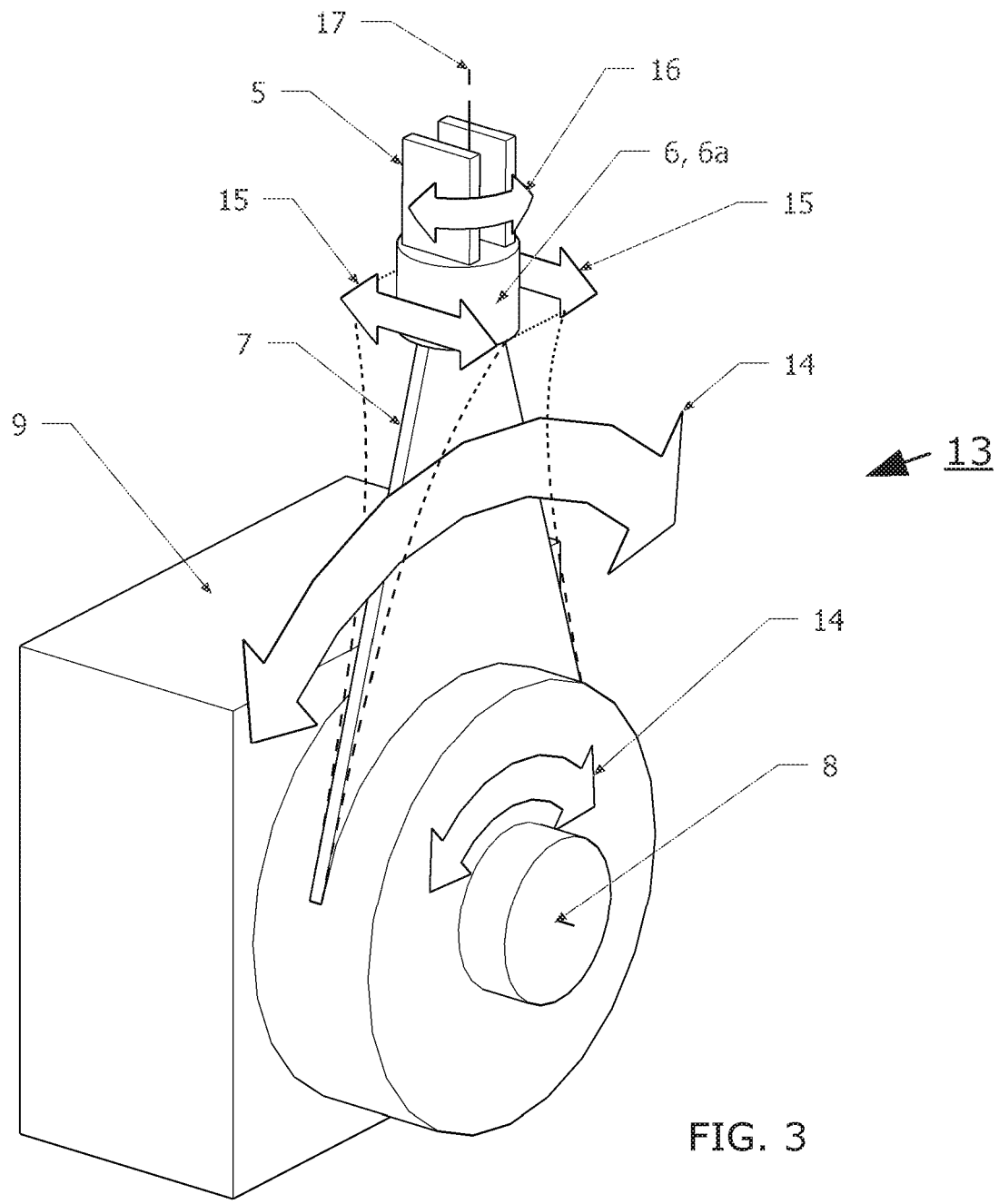
FIG. 3 shows details of a transmission assembly in one embodiment.
Figure 4:
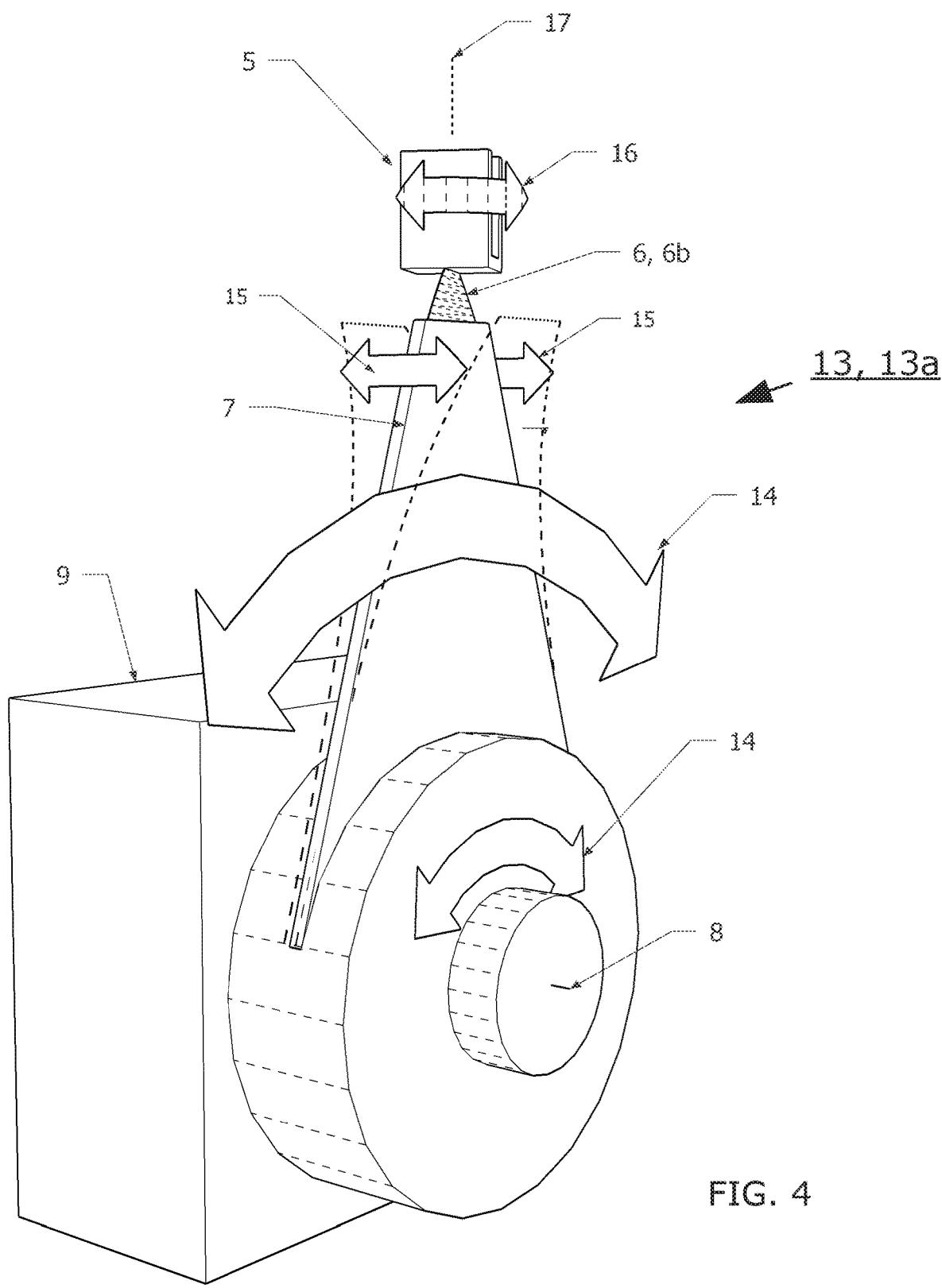
FIG. 4 shows details of a transmission assembly in one embodiment.

In one embodiment, in its strained state the crenated strip fin 3 is prevented from returning to its relaxed state by being fixed in at least two locations along an inner edge 4 to a first coupling 5 that is fixed to a vertebra plate 7, for example, via a rotation-enabling component 6 which may be a bearing 6a, FIG. 3, or other component that allows the transmission of force from the first coupling 5 and vertebra plate 7 while allowing partial rotation between the first coupling 5 and the vertebra plate 7, such as a flexible planar plate 6b, FIG. 4, torsion spring, rubber bushing and/or the like. The vertebra plate 7 is fixed to the shaft 8 of an actuator 9 such as an electromagnetic motor, hydraulic motor, servo etc., FIG. 2. The actuators may be fixed to a common member 10 and are powered by a battery 11 or other power source. In one embodiment the rotational positions of the actuators 9 may be controlled by a central controller 12.

In one embodiment the first coupling 5, rotation-enabling component 6, vertebra plate 7 and shaft 8 comprise a transmission assembly 13, FIG. 3.

In one embodiment the point of attachment of the crenated strip fin 3 to the transmission assembly 13, 13a, 13b has three degrees of freedom of movement. The actuator 9 induces rotation 14 of the vertebra plate 7 about the axis of the shaft 8. Since in one embodiment the vertebra plate 7 is flexible in the direction 15 parallel to the axis of the shaft 8, the end of the vertebra plate 7 where it is fixed to the rotation-enabling component 6 is able to shift 15 in a direction parallel to the axis of the shaft 8. The rotation-enabling component 6 allows the first coupling 5 to at least partially rotate 16 about an axis 17 perpendicular to the shaft 8, FIG. 4.

Figure 5:
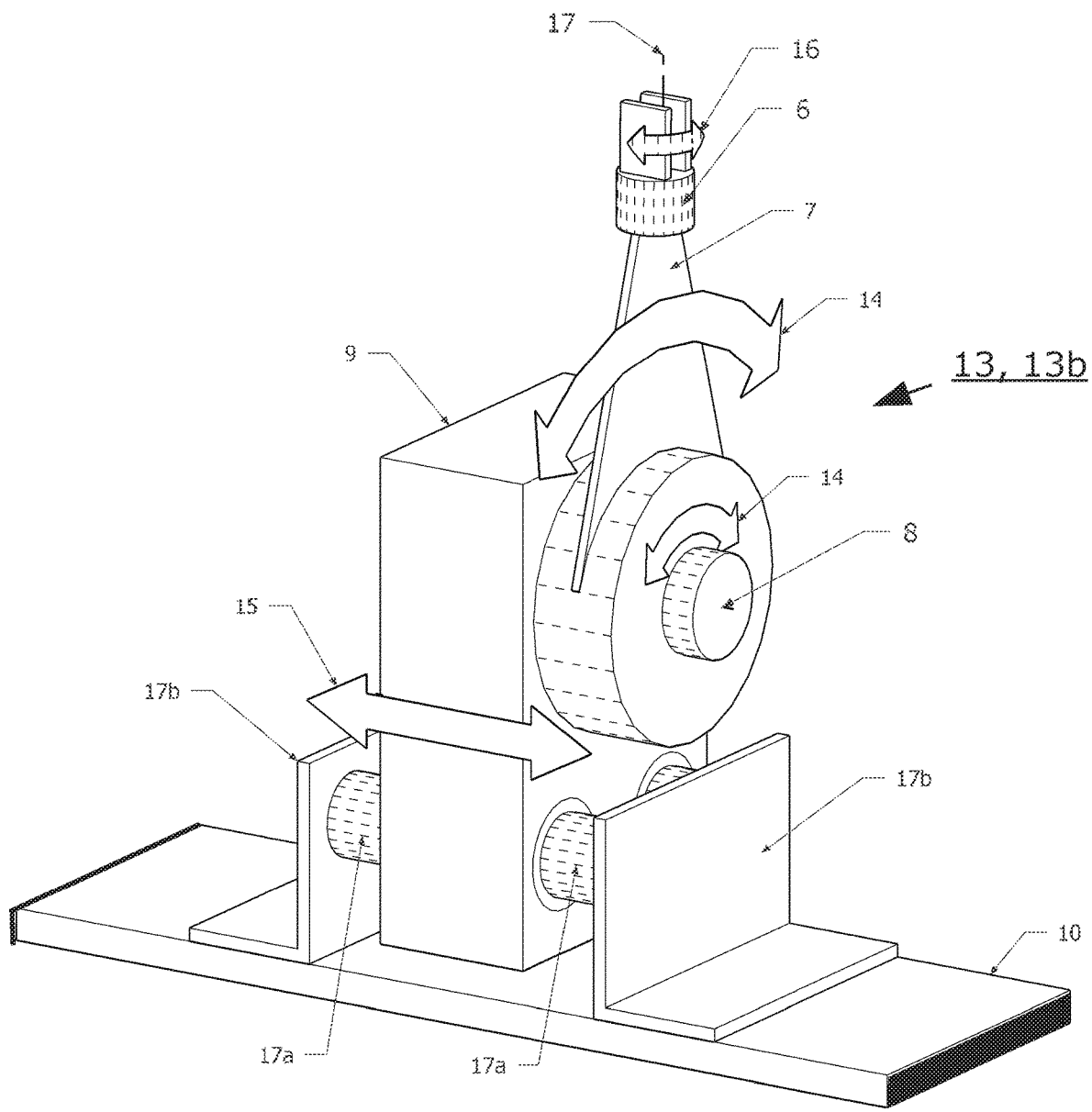
FIG. 5 shows details of a transmission assembly in one embodiment.

In one embodiment, the vertebra plate 7 may be rigid and motion of the transmission assembly 13, 13b in a direction 15 parallel to the direction of the axis of the shaft 8 may be facilitated by a bearing track, sleeve bearings 17a and/or the like, FIG. 5. The transmission assembly 13, 13b may be coupled to the common member 10 via mounting fixtures 17b.

Figure 6:
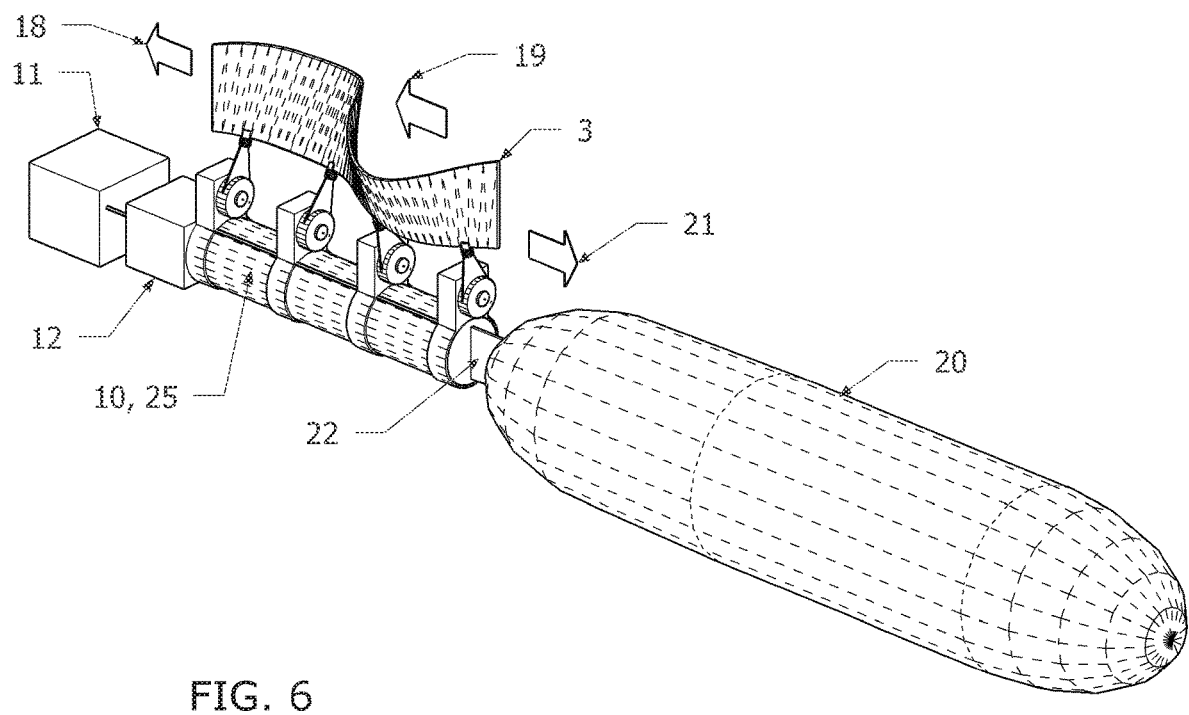
FIG. 6 shows an embodiment attached to a vessel and mode of operation in one embodiment.

The central controller 12 induces the actuators 9 to rotate the vertebra plates 7 clockwise and counterclockwise in a sequence that causes a traveling wave to move along the crenated strip fin 3. When the mechanism in placed in a fluid medium, FIG. 6, fluid is primarily moved 18 in the direction of the traveling wave 19, causing the mechanism as well as a body 20 that may be attached to it via a harnessing fixture 22, to travel in a direction 21 opposite to that of the traveling wave 19. Some examples of applications include surface craft or sub-sea marine propulsion, propulsion for lighter-than-air vehicles and/or the like.

The central controller 12 and battery 11 or other power source may be placed, e.g., inside the common member 10 which in some implementations may be water tight or air tight. One fin, or two fins FIG. 7, or more than two fins may, in one implementation, be attached to the common member 10 via transmission assemblies 13, 13a, 13b, to create a free-swimming vessel or vehicle which is able to move through fluid by imparting forces to the fluid, such as described above. For a craft utilizing such an embodiment, thrust vectoring may be facilitated to control the vessel's pitch, yaw, roll, direction, turning, and other controlled movements which may be executed via the central controller 12. Sensors such as accelerometers, gyroscopes, inertial measurement units, compass, optic flow sensors, sonar, lidar, and fluid motion sensors such as pressure and velocity sensors, and/or the like, may feed into the central controller 12 to achieve desired behavior of the vessel, vehicle or mechanism.

Figure 7:
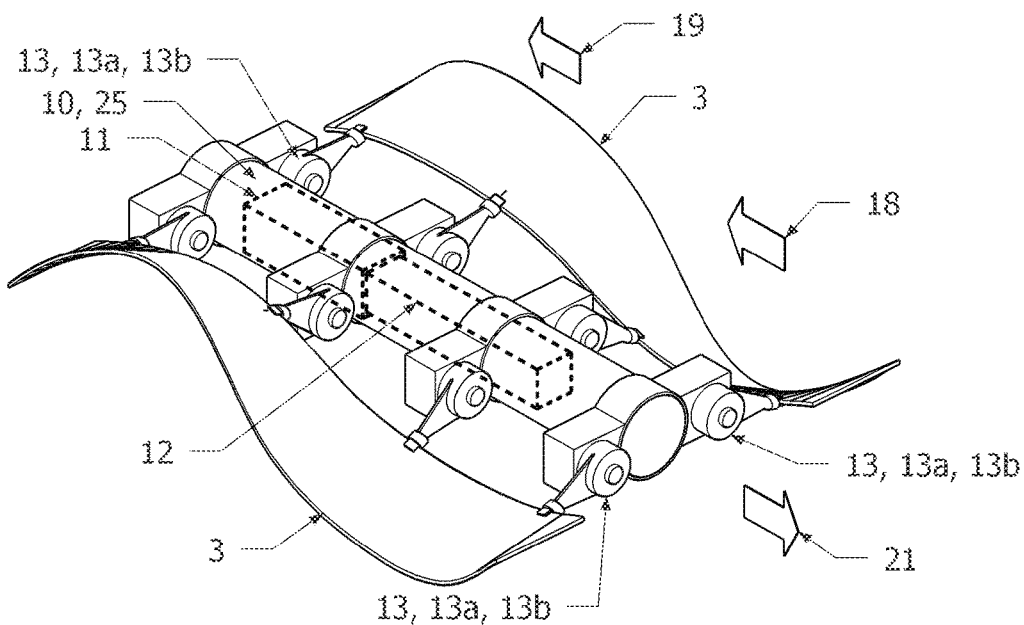
FIG. 7 shows an embodiment of a free-swimming vessel in one embodiment.
Figure 8:
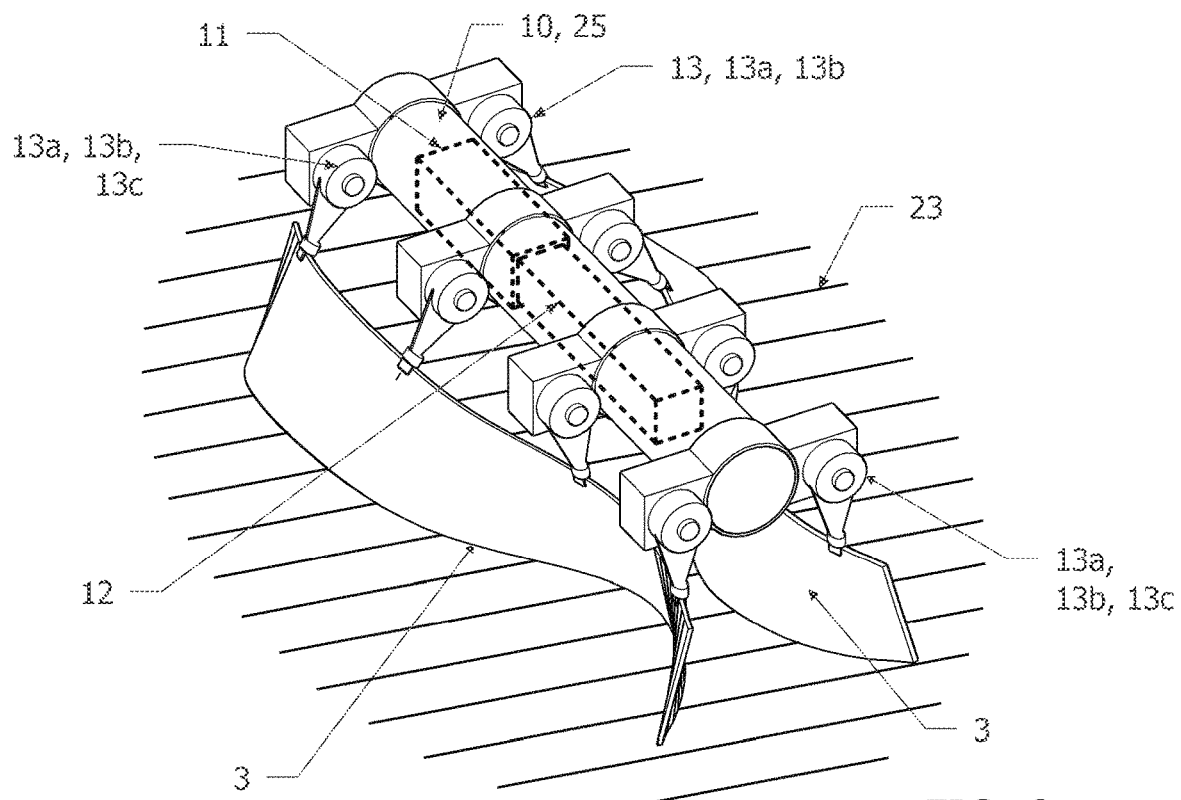
FIG. 8 shows an embodiment of a vessel or vehicle capable of moving on land in one embodiment.

The mechanism illustrated in FIG. 7 may also be configured, in some embodiments, to move itself on land or other substrate 23, e.g., by adjusting the position of the fins 3 to make contact with the land or other substrate 23, and by configuring the transmission assemblies 13, 13a, 13b, via the central controller 12, yielding a crawling or "slithering" action, to move the vessel or vehicle in a desired direction, FIG. 8.

In another implementation, the mechanism described above and illustrated in FIG. 6, instead of being fixed to a body 20 via a harnessing fixture 22, may be fixed to an immovable object or substrate 23 via a harnessing fixture 22. The traveling-wave 19 along the crenated strip fin 3 induced by transmission assemblies 13, 13a, 13b may cause fluid such as air or water to primarily move 18 in the direction of the traveling wave 19, FIG. 9. Applications include fluid-moving devices such as fans or pumps; fluid transportation or mixing, e.g. for industrial and chemical applications; aggregate, particle or powder mixing or transportation, e.g. for industrial and chemical applications, and/or the like.

In another embodiment, the vertebra plate 7 has two or more lobes that may be evenly-spaced and may be rotationally symmetrical about the axis of the shaft 8. A three-lobed vertebra plate 24 is shown for example in FIG. 10. The common member 10 described above in this embodiment may be a chassis-like structure 10, 25 consisting of at least mainly longitudinal elements 10, 25, 26 and at least mainly transverse elements 10, 25, 27 to which at least one actuator 9 is fixed. The actuator 9 or actuators 9 are fixed to the chassis 25 which provide reaction torque for the actuator 9 or actuators 9. A crenated strip fin 3 is fixed to at least one lobed vertebra plate 24 via the first coupling 5. In one embodiment at least one actuator 9 is employed to actuate at least one lobed vertebra plate 24. In one embodiment a central controller 12 controls the actuator 9 or actuators 9 and a battery 11 or other power source powers the central controller 12 and actuator 9 or actuators 9.

Figure 10:
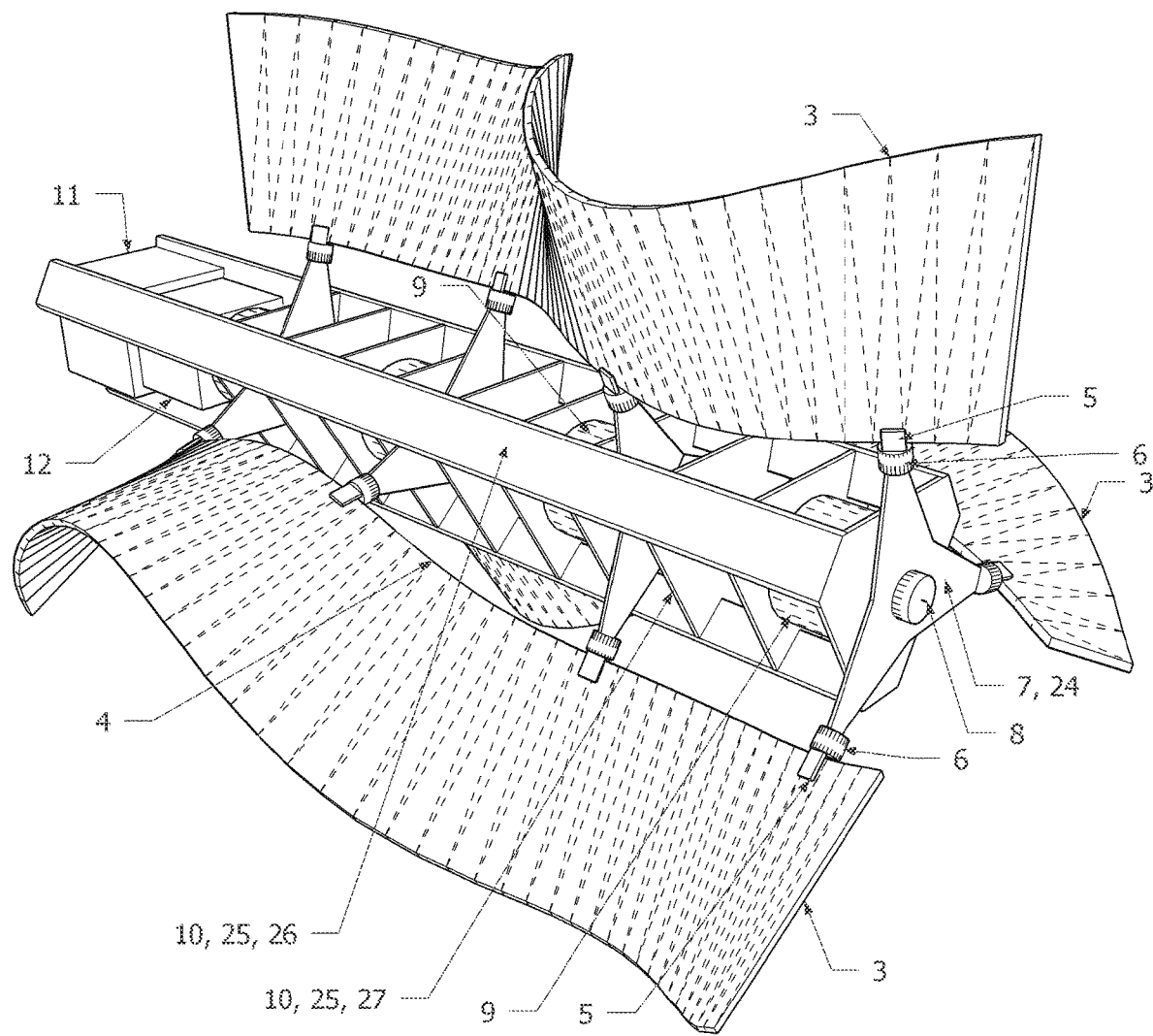
FIG. 10 shows another implementation of one embodiment.
Figure 11:
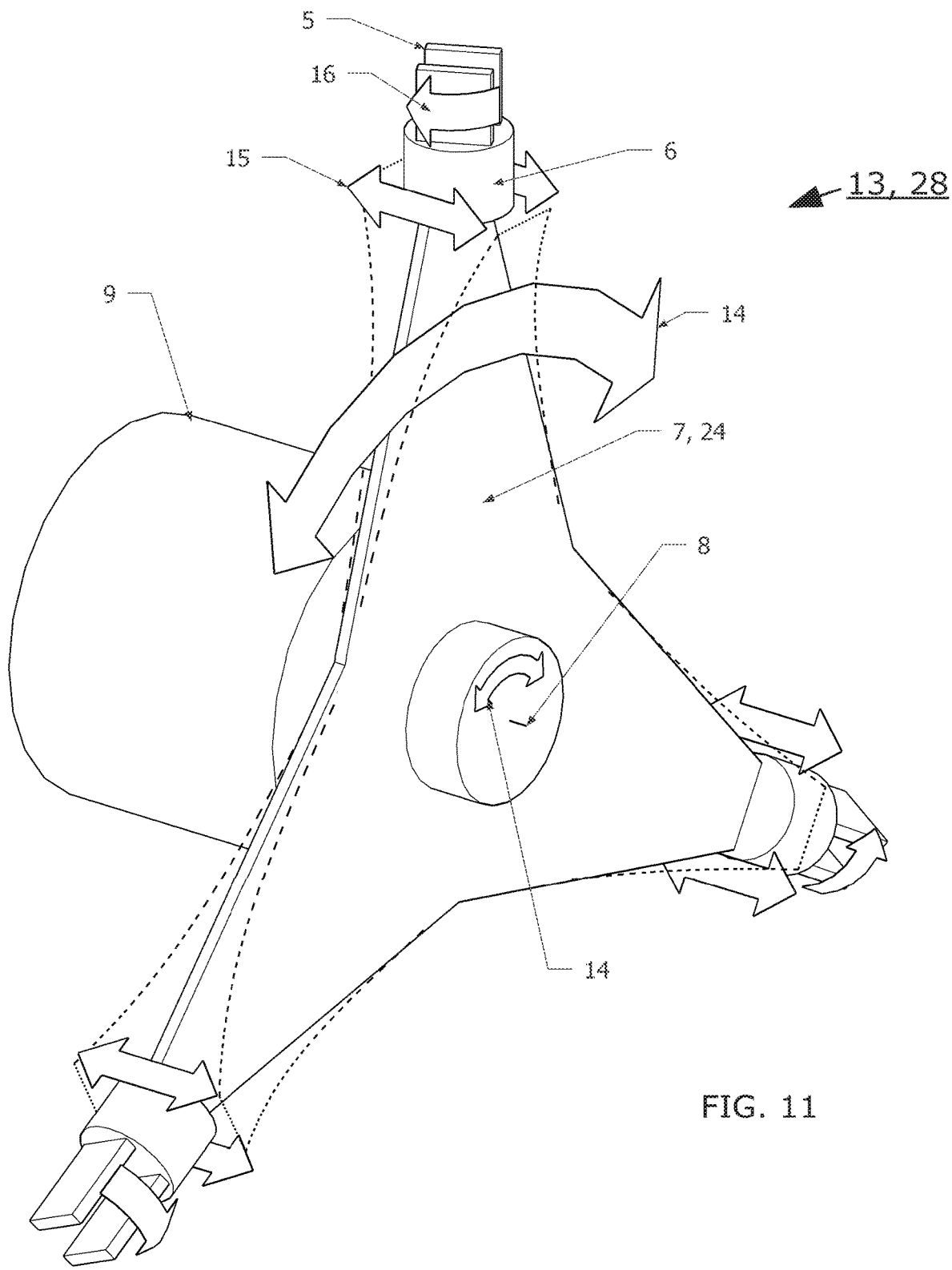
FIG. 11 shows details of a transmission assembly in one embodiment.

The transmission assembly 13, 28, FIG. 11, for the embodiment shown in FIG. 10 may in one embodiment be comprised of a first coupling 5, rotation-enabling component 6, lobed vertebra plate 24 and shaft 8 powered by an actuator 9 and allow three degrees of freedom of motion.

Figure 9:
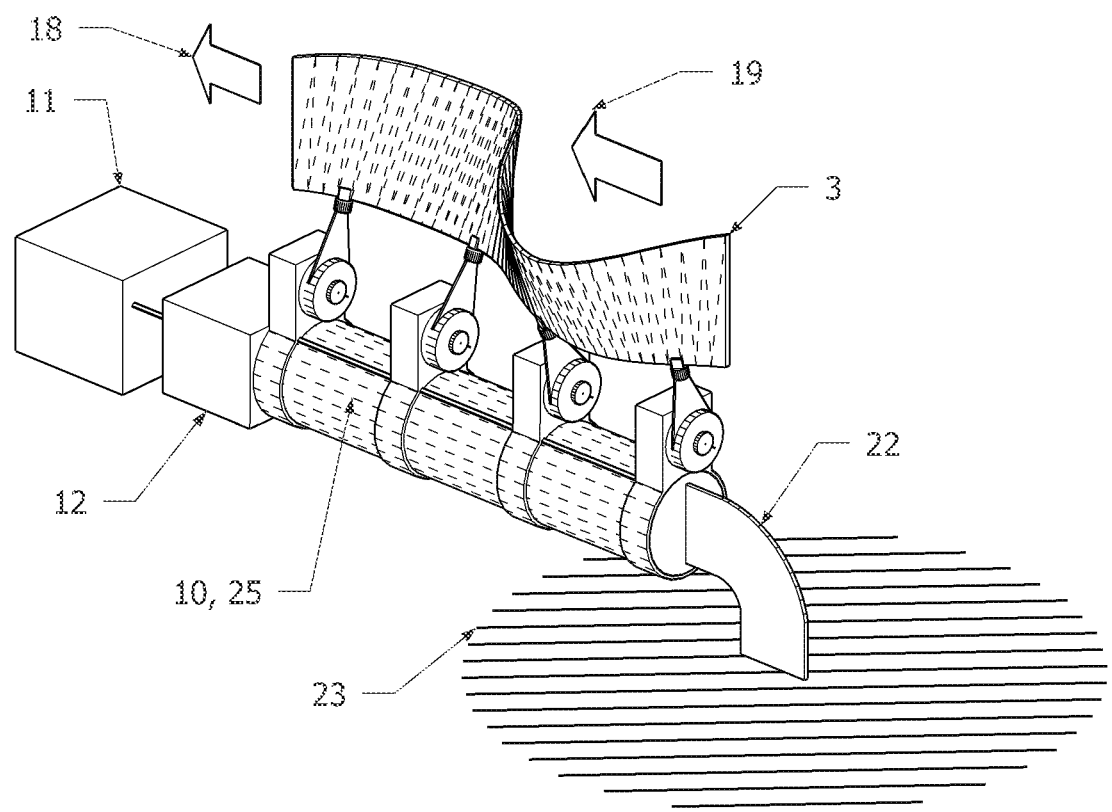
FIG. 9 shows and embodiment attached to an immovable object or substrate and mode of operation in one embodiment.
Figure 12:
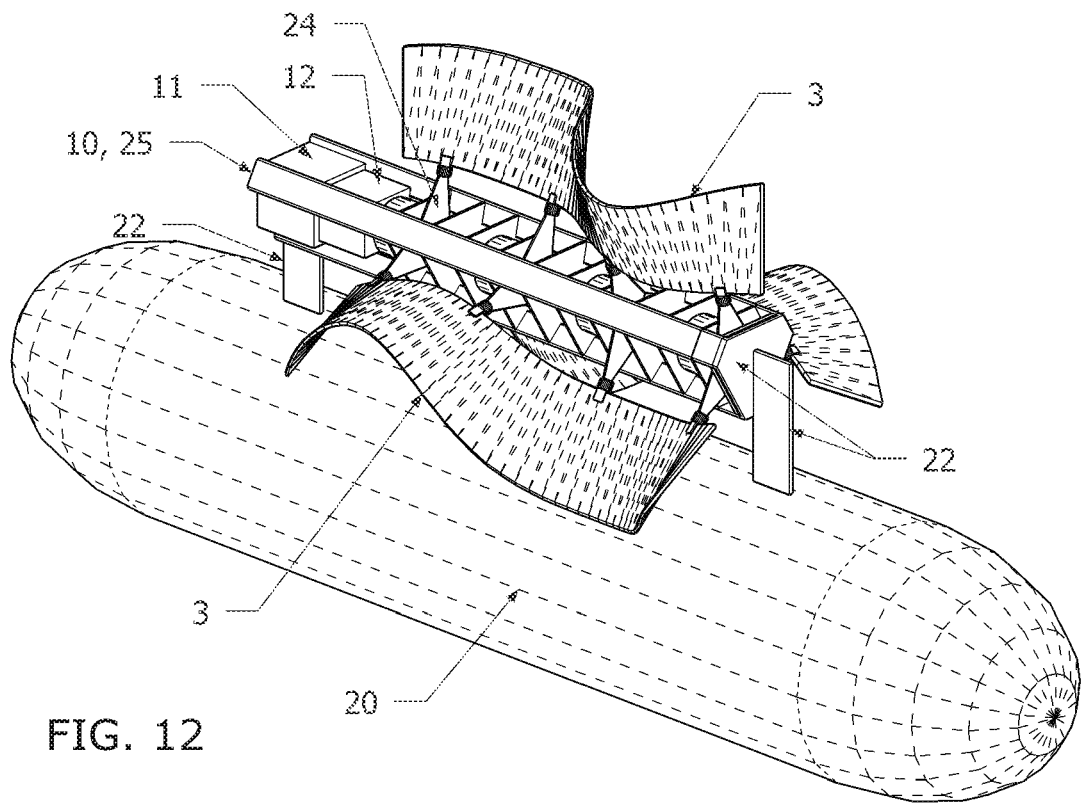
FIG. 12 shows an implementation attached to a vessel in one embodiment.
Figure 13:
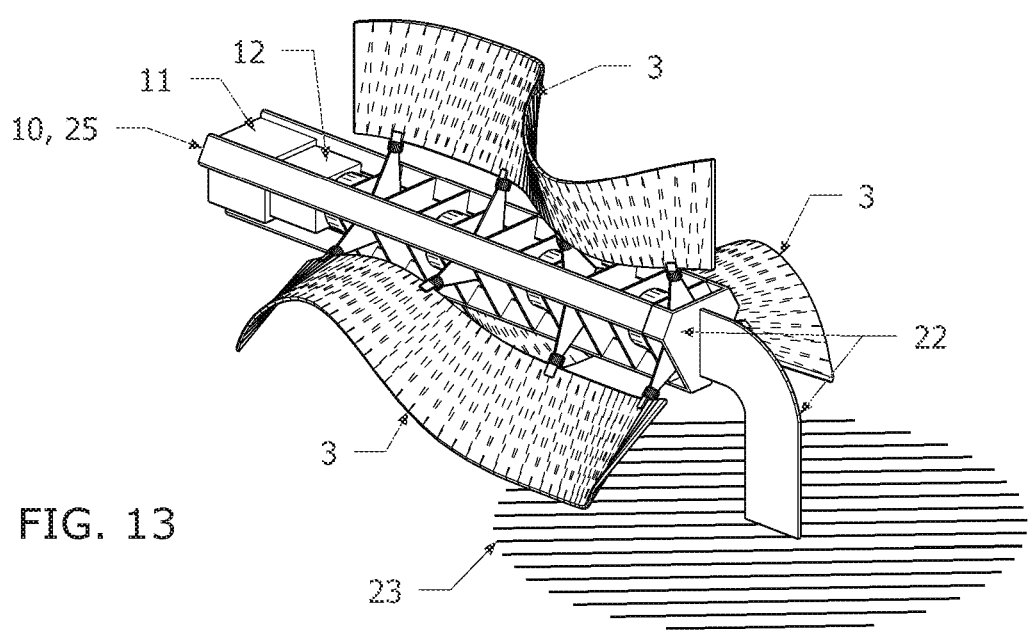
FIG. 13 shows an implementation attached to an immovable object or substrate in one embodiment.

In another embodiment, one or more harnessing fixtures 22 may be added at a location or locations on the chassis 10, 25, so that the mechanism may be fixed to another body or to an immovable object or substrate 23. In embodiments where the other body 20 is a vessel, such as a boat, submersible or lighter-than-air craft, FIG. 12, the mechanism under operation may provide propulsive thrust in the manner shown in FIG. 6. In embodiments where the other body is an immovable object or substrate 23, FIG. 13, the mechanism under operation may move ambient fluid in a desired direction or desired directions for the purposes of fluid transport or for the purposes of fluid, particle and aggregate mixing, in a similar manner as shown in FIG. 9.

In another embodiment, the actuators 9 are electromagnetic and/or other transducers capable of energy harnessing. In such an embodiment, when the harnessing fixture 22 is attached to an immovable object or substrate 23, ambient fluid with directional motion may cause the deformations of the crenated strips 3 to move in a traveling wave in the direction of fluid motion. Kinetic energy from the moving fluid is transferred to the crenated strip 3 and may be converted into electrical energy via the actuators 9. In one embodiment the energy may be stored in a battery 11, FIGS. 9, 13, 14.

Figure 14:
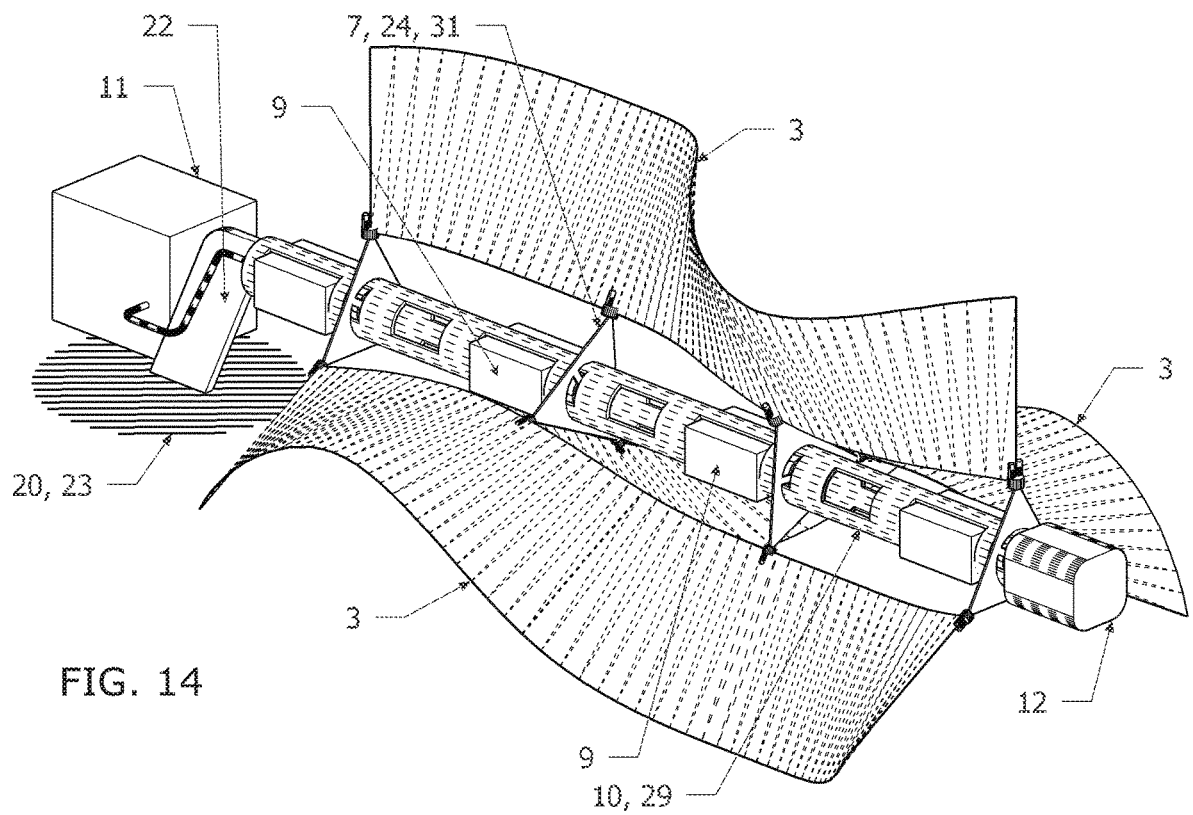
FIG. 14 shows another implementation of one embodiment.

In another embodiment the common member 10 is a chassis-like structure 29 to which the actuators 9 are fixed, FIG. 14. In one implementation the chassis-like stricture 29 passes contiguously through slots 30 in vertebra plates 7, 24 to make them slotted vertebra plates 31 allowing the actuators 9 to rotate the slotted vertebra plates 31 without colliding with the chassis-like structure 29.

Figure 15:
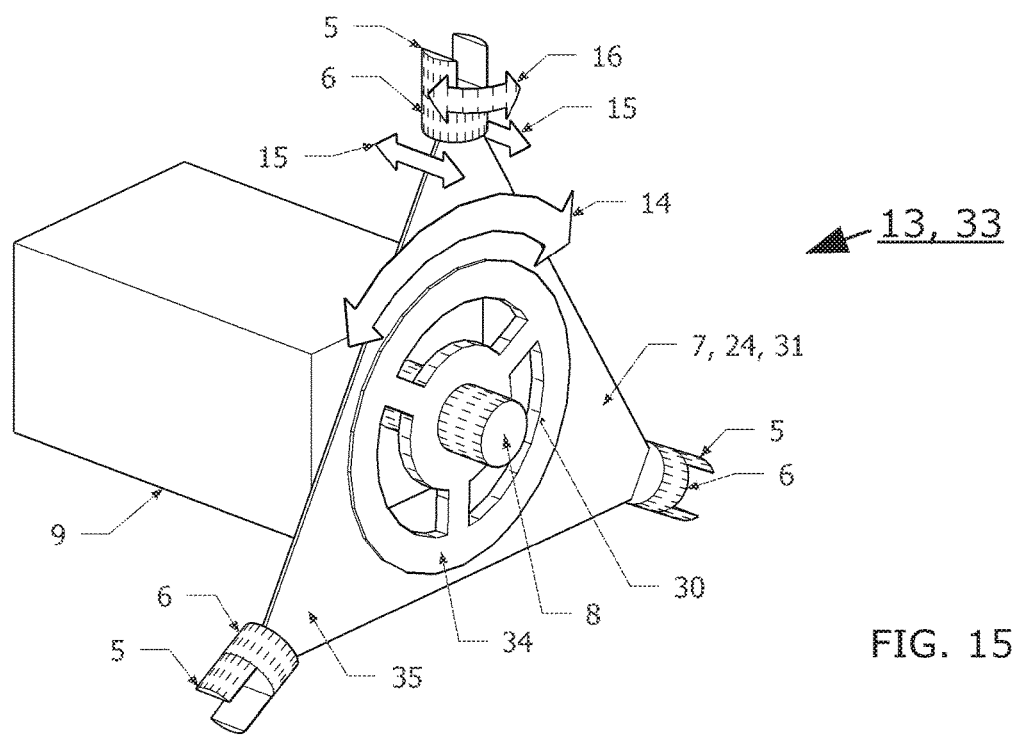
FIG. 15 shows details of a transmission assembly of one embodiment.

In one implementation the transmission assembly 33, FIG. 15 for this embodiment accommodates three degrees of freedom and may consist of a shaft 8 powered by an actuator 9, first couplings 5, rotation-enabling component 6 and slotted vertebra plate 31. In one implementation the inner area 34 of the slotted vertebra plate 31 is thicker or stiffer or wider than the regions 35 nearer the point of attachment to the bearing component, to allow torque transmission from the shaft 8 while also allowing the portion 35 of the slotted vertebra plate 31 near the rotation-enabling component 6 to bend and shift along an axis 15 parallel to that of the shaft 8.

Figure 16:
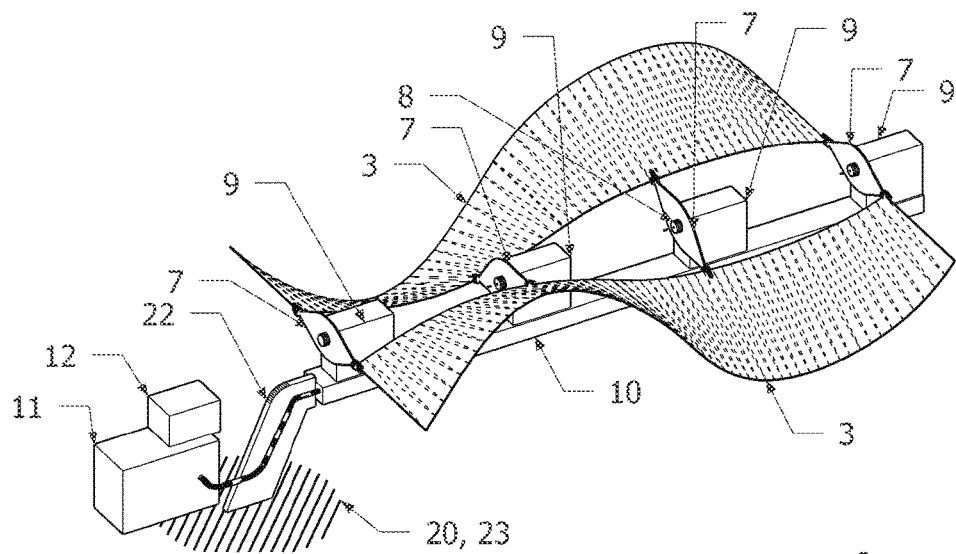
FIG. 16 shows an implementation with two fins sharing common actuators in one embodiment.
Figure 19:
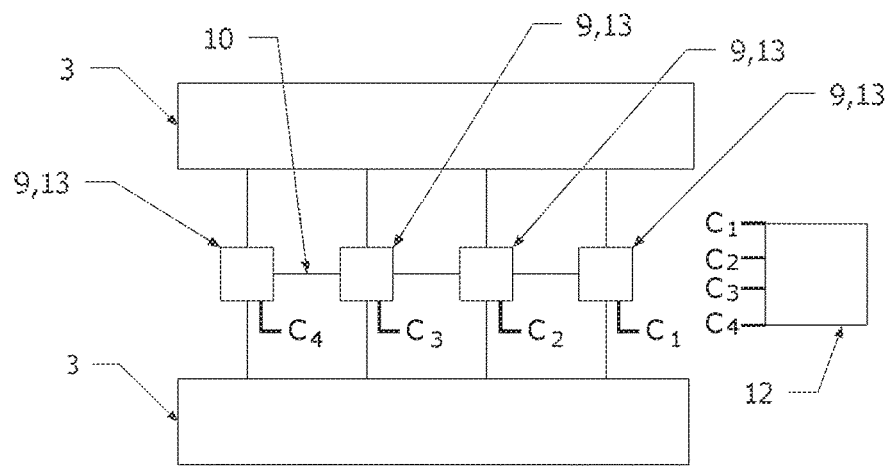
FIG. 19 is a diagram of an implementation with two fins sharing common actuators in one embodiment.

In one embodiment, FIG. 16 and FIG. 19, two or more transmission assemblies 13 powered by actuators 9, fixed to a common member 10, powered by a battery 11 or other power source, and controlled by a central controller 12, may be shared by two or more crenated strip fins 3, FIG. 19. The common member 10 is fixed to a harnessing fixture 22 which is fixed to an immovable object or substrate 23 or the body of a vessel 20 in a similar manner as described in the embodiments above. Clockwise and counter-clockwise rotation of the transmission assemblies 13 may cause the sinusoidal deformations of both crenated strip fins 3 to travel in the same direction as each other along the axis of the shafts 8.

Figure 17:
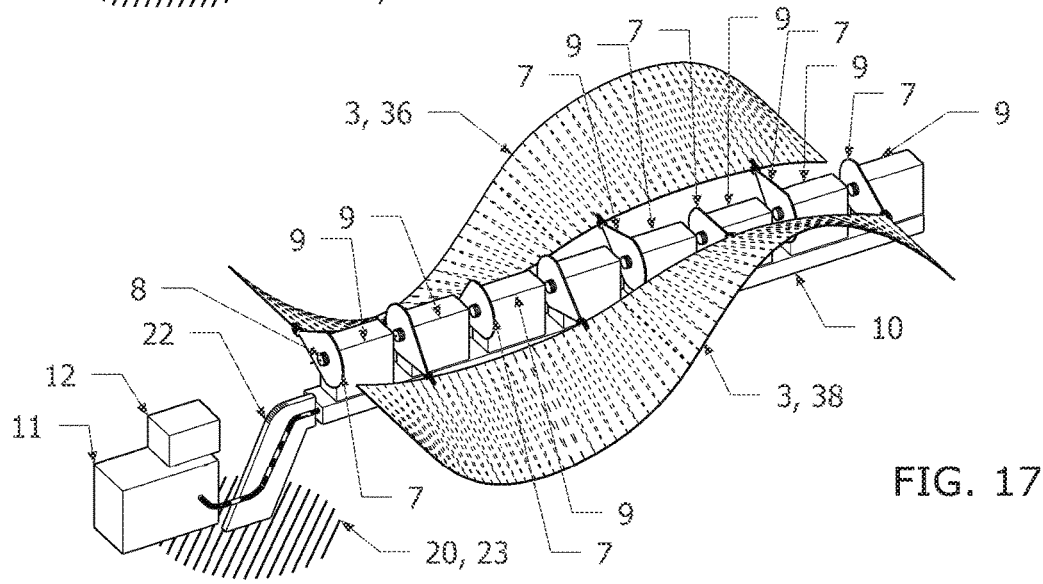
FIG. 17 shows an implementation with two fins on two sets of actuators in one embodiment.
Figure 20:
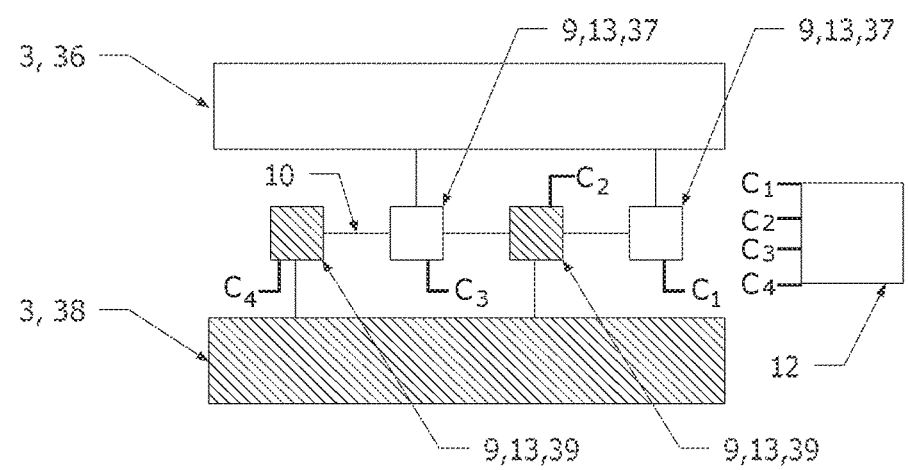
FIG. 20 is a diagram of an implementation with two fins on two sets of actuators in one embodiment.
Figure 21:
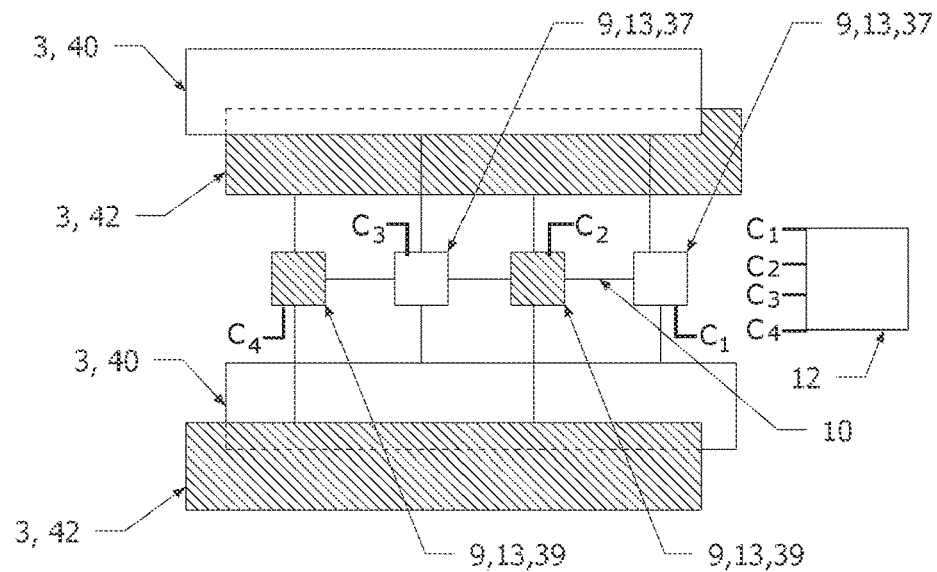
FIG. 21 is a diagram of an implementation with two pairs of fins on two sets of actuators in one embodiment.

In another embodiment with two crenated strip fins 3, FIG. 17 and FIG. 20, one crenated strip fin 3, 36 is attached to one set of transmission assemblies 13, 37 and the other crenated strip fin 3, 38 is connected to a second set of transmission assemblies 13, 39, FIG. 20. This allows one crenated strip fin 3, 36 to operate independently of the other crenated strip fin 3, 38 under control of the central controller 12. This in turn allows in one implementation the deformations of one crenated strip fin 3, 36 to travel in the opposite direction to the other crenated strip fin 3, 38. The degree of transmission assembly 13 rotation may vary between sets of transmission assemblies as well as within a set of transmission assemblies. For a craft utilizing such an embodiment, thrust vectoring is therefore facilitated to control the vessel's pitch, yaw, roll, direction, turning, and other controlled movements which may be executed via the central controller 12. (FIGS. 19-21, for example). Sensors such as accelerometers, gyroscopes, inertial measurement units, compass, optic flow sensors, sonar, lidar, and fluid motion sensors such as pressure and velocity sensors, and/or the like, may feed into the central controller 12 to achieve desired behavior of the vessel, vehicle or mechanism.

Figure 18:
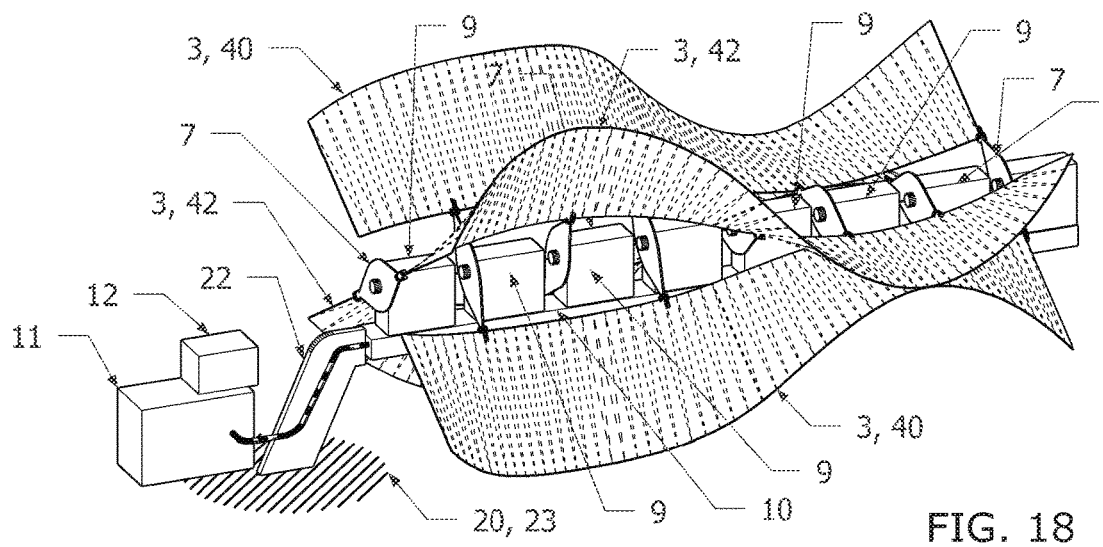
FIG. 18 shows an implementation with two pairs of fins on two sets of actuators in one embodiment.

Another implementation utilizes two pairs of crenated strip fins 3, FIG. 18 and FIG. 21. A first pair 40 is connected to one set of transmission assemblies 13, 37 and a second pair 42 is connected to a second set of transmission assemblies 13, 39, FIG. 21 which may allow the implementation to exert more thrust without adding actuators 9. For a craft utilizing such an embodiment, thrust vectoring may be facilitated to control the vessel's pitch, yaw, roll, direction, turning, and other controlled movements which may be executed via the central controller 12, such as described above.

In another embodiment FIGS. 22-23, a single actuator 43 may be used to drive more than one transmission assembly 13, 44 simultaneously through the use of a crank shaft, Scotch Yoke, cam shaft and/or the like. An example is shown in FIG. 22 using a shaft with conjugate cams, and where a battery or other power source 11 powers at least one actuator 43 attached to a common member 10. Two or more transmission assemblies 13, 44, FIG. 23, are mounted to the common member 10 with transmission assembly mounts 46. Rotation 46a of the cam shaft 47 causes the vertebra plates 7, 48 of two or more transmission assemblies 13, 44 to rotate clockwise and counterclockwise 14 in a similar manner as described in embodiments above. The transmission assemblies 13, 44 are coupled to the crenated strip fin 3 in a similar manner as described in embodiments above. The common member 10 may be attached to an immovable object or substrate 23 or the body of a vessel 20, FIG. 22, in a similar manner and for similar purposes as described in embodiments and implementations above.

Figure 24:
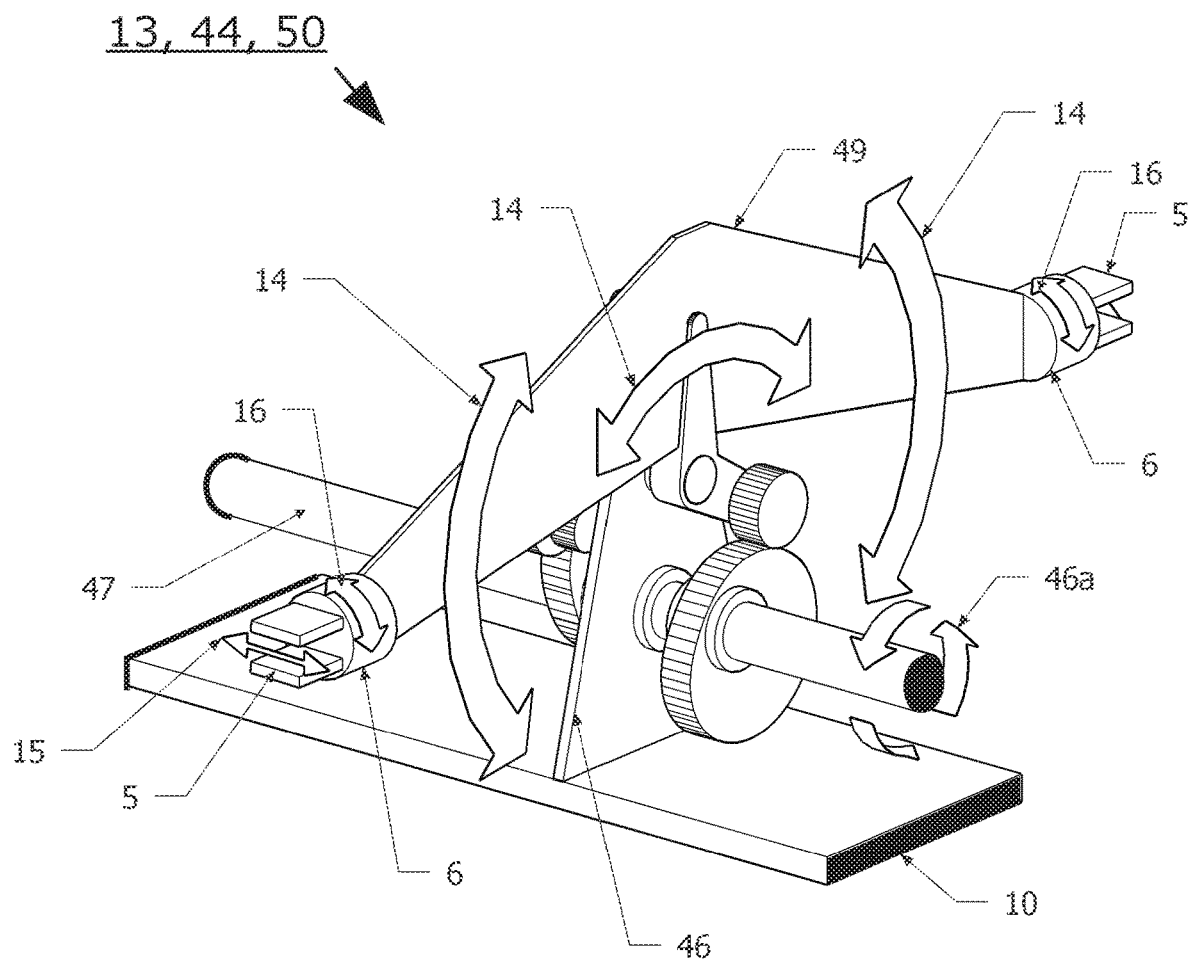
FIG. 24 shows details of a transmission assembly of another implementation having a cam in one embodiment.
Figure 25:
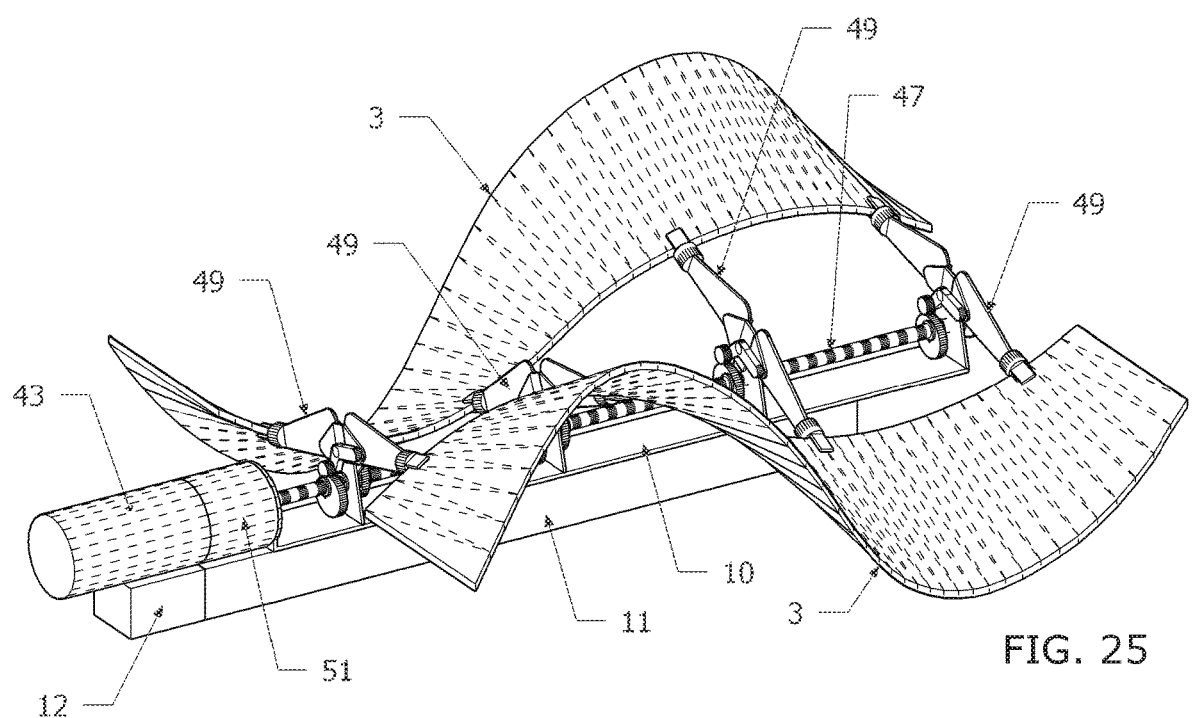
FIG. 25 shows an implementation with two pairs of fins sharing cam driven actuators in one embodiment.

In another embodiment, the transmission assembly 13, 44 may be coupled to two or more crenated strip fins 3 via a lobed vertebra plate 49 with more than one crenated strip fin 3 attachment to the same lobed vertebra plate 49, to create a lobed transmission assembly 50 with more than one fin attached, FIG. 24. At least one lobed transmission assembly 50 mounted to a common member 10 may be actuated via an actuator 43 such as an electric motor and a central controller 12, and powered by a battery 11 or other power source to create a mechanism that may be free-swimming, and which may have a gear box 51 between the actuator and cam shaft 47, FIG. 25.

Figure 26:
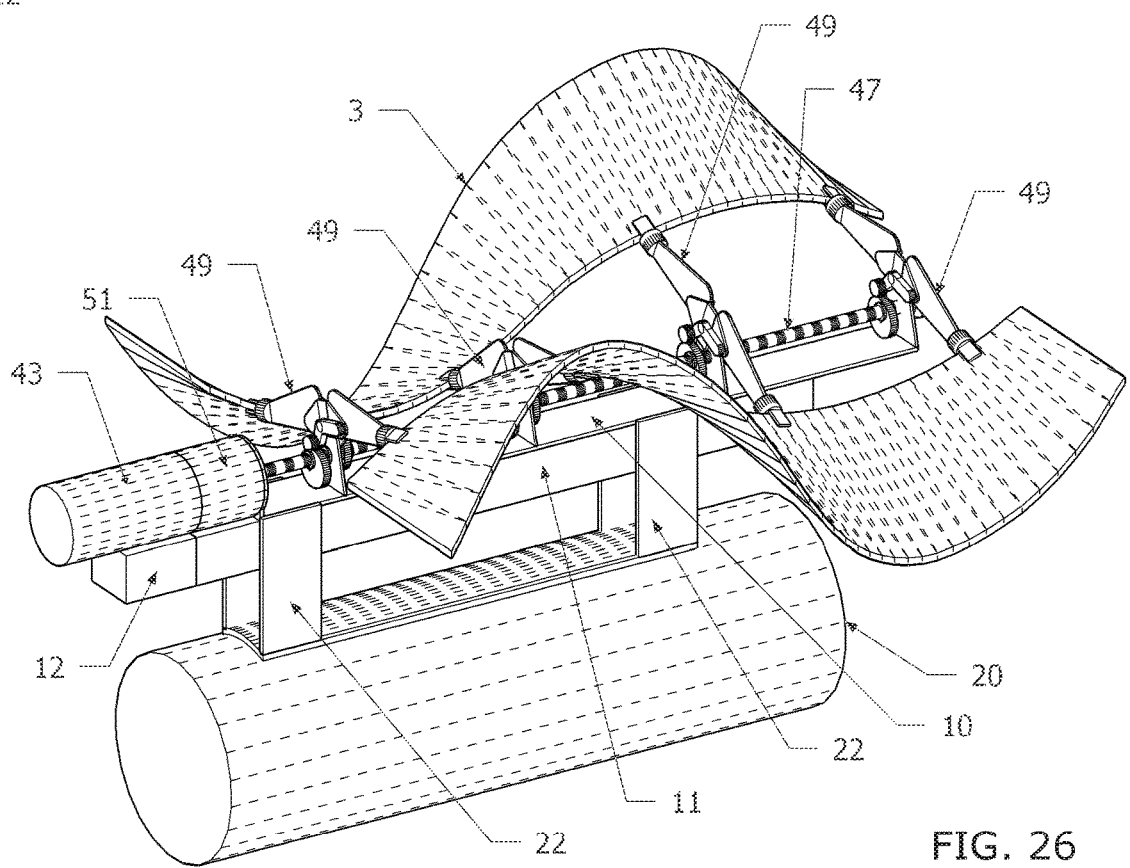
FIG. 26 shows an implementation with two pairs of fins sharing cam driven actuators in another embodiment.

In another embodiment, the mechanism may be attached via one or more harnessing fixtures 22 to a body 20, to provide thrust to the body 20. The body may be a sub-sea vessel, surface craft, or the body part of a person swimming or diving in water, or the body 20 may be attached to equipment worn by a person swimming or diving, FIG. 26.

Figure 27:
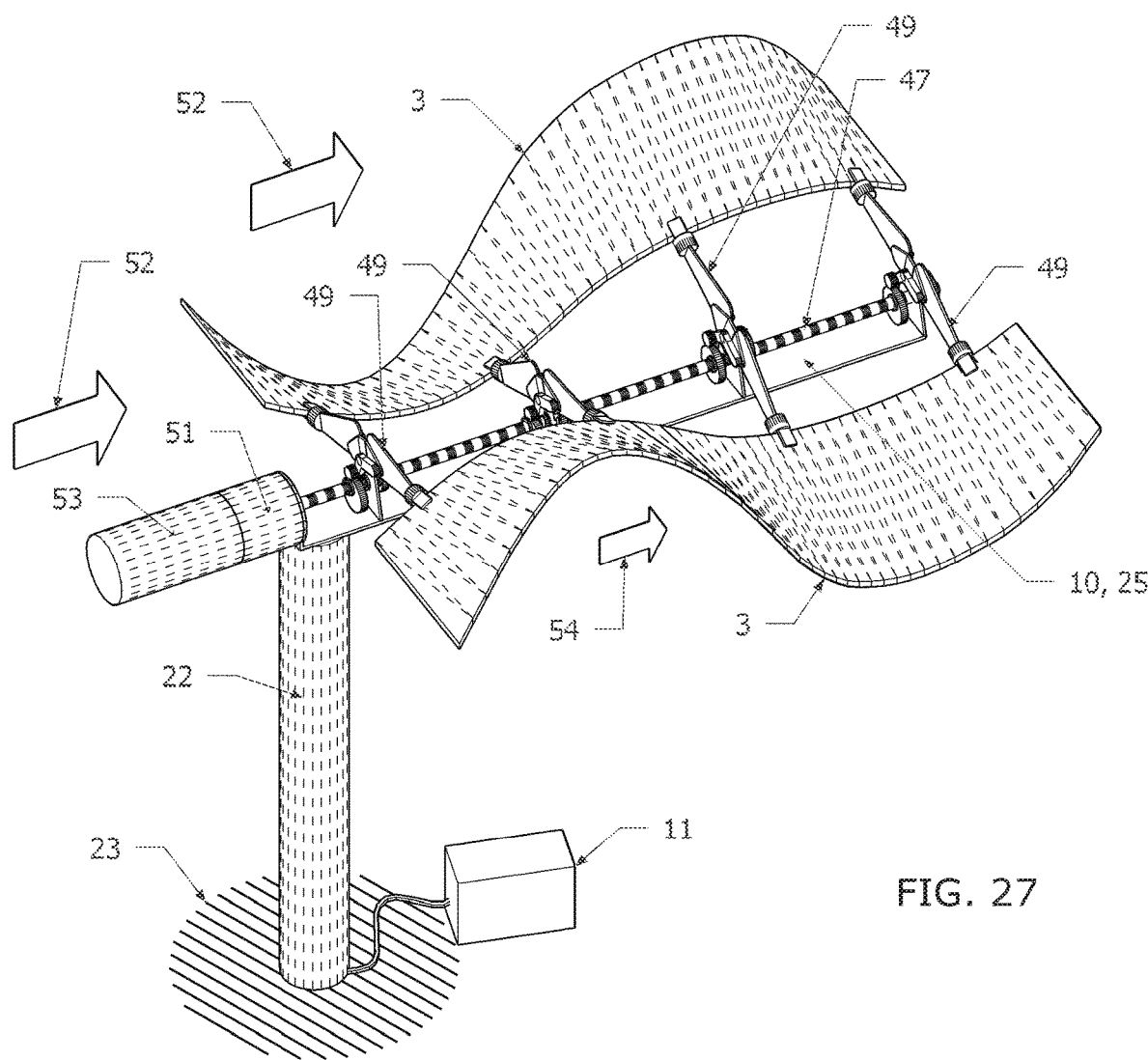
FIG. 27 shows a generator implementation in one embodiment.

In one generator implementation, the common member 10, 25 may be fixed to a harnessing fixture 22 which is fixed to an immovable object or substrate 23, FIG. 27. Moving fluid 52 may exert loads on the fins 3 which may induce the strained deformations in the fins 3 to travel 54 in the direction of the moving fluid 52 to induce rotation of the shaft 47 via transmission assemblies 13, 44, 50. The shaft 47 may be rotationally coupled to a gear box 51 coupled to an electromagnetic generator 53 or other transducer capable of turning rotational action into electrical energy. Electricity from the electromagnetic generator 53 or other transducer may be sent to a battery 11 or an electrical grid.

It is to be understood that the implementations described herein facilitate significant flexibility and that many changes, modifications, variations and other uses and applications of the described implementations are possible. All such changes, modifications, variations and other uses and applications which do not depart from the spirit and scope of the invention are deemed to be covered by the implementations described herein and variants thereof.

Figure 28:
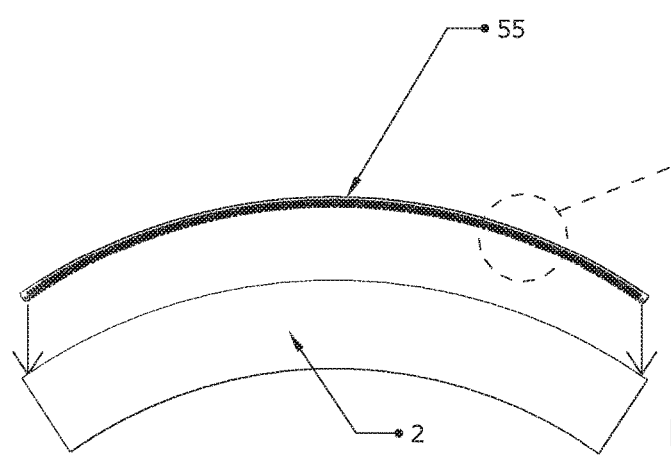
FIGS. 28-29 show an arched blade added to one edge of the arc-like flexible sheet-like material in one embodiment.
Figure 29:
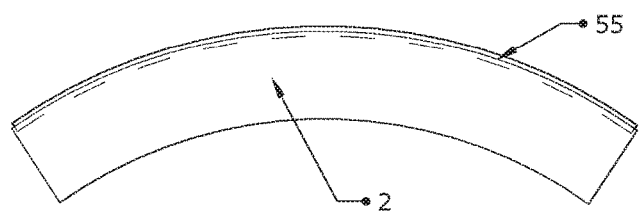
Figure 30:
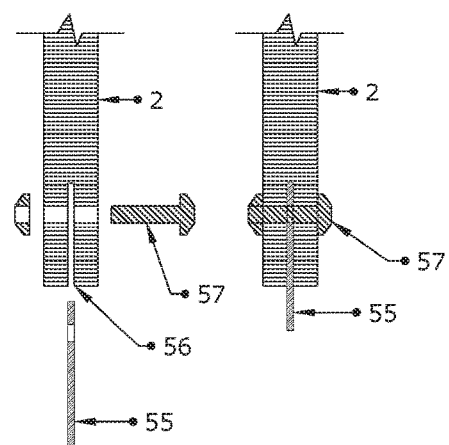
FIG. 30 shows a cross section through the edge of the flexible sheet-like material in one embodiment.
Figure 31:
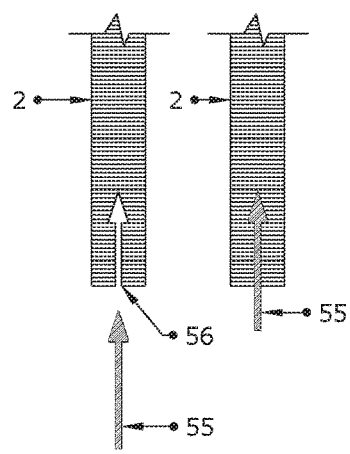
FIG. 31 shows a cross section of an implementation in which the arched blade has a thickening or flange along the edge in one embodiment.

In another embodiment, an arched blade 55 is added to one edge of the arc-like flexible sheet-like material 2, FIG. 28. The arched blade 55 may, for example, be made from a hard, flexible material having high resilience such as stainless steel, a hard polymer, and/or the like. The arched blade 55 may, e.g., be attached to the side of one edge of the flexible sheet-like material 2, or it may be inserted into a slot 56 in one edge of the flexible sheet-like material 2, FIGS. 28-29. FIG. 30 shows a cross section through the edge of the flexible sheet-like material in which the arched blade 55 is inserted into a slot 56 and fixed via a rivet, bolt, grommet, or similar coupling component 57 that passes through a hole in the flexible sheet-like material and the arched blade 55. FIG. 31 shows a cross section of an implementation in which the arched blade 55 has a thickening or flange along the edge that is inserted into the slot 56, and where the slot 56 has a widening that accommodates the cross-sectional profile of the arched blade 55 to mechanically hold the arched blade 55 in the slot 56. In addition to or instead of these mechanical means of fixing the arched blade 55 to the flexible sheet-like material 2, glue, or another bonding agent may be applied to secure the arched blade 55 to the flexible sheet-like material 2.

Figure 32:
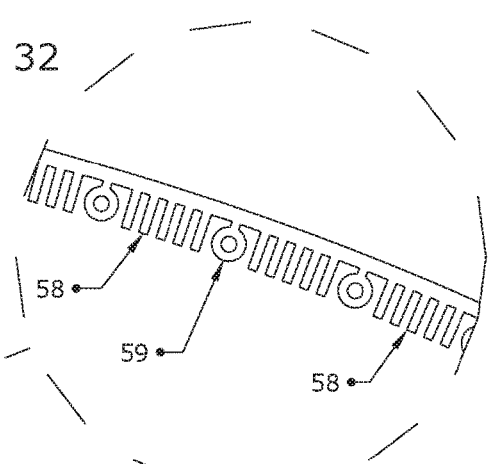
FIG. 32 shows an implementation of the arched blade wherein the outer radius edge of the arched blade forms a continuous arc but its inner edge is comprised of a series of narrow tabs in one embodiment.

In another implementation of the arched blade 55, the outer radius edge of the arched blade 55 forms a continuous arc but its inner edge is comprised of a series of narrow tabs 58 to reduce in-plane bending loads on the arced blade 55, and a series of eyelets 59 contiguous with the arched blade 55, FIG. 32. In examples of this implementation, the coupling components 57 that pass through the flexible sheet-like material may pass through the eyelets.

Figure 33:
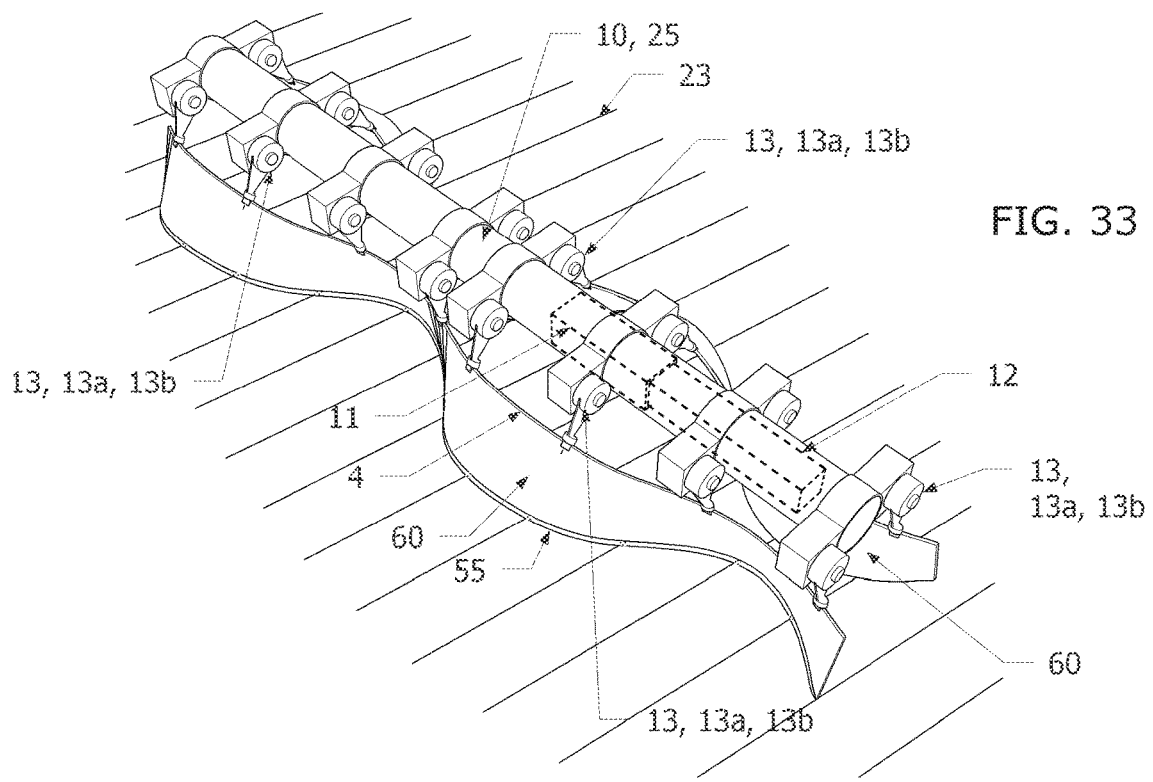
FIG. 33 shows an implementation of two or more composite fin, each coupled to two or more transmission assemblies in one embodiment.

Once the arched blade 55 has been installed in the flexible sheet-like material 2, force or forces 1 are applied to the flexible sheet-like material 2 to which the arched blade 55 has been fixed to create a deformed crenated strip composite fin 60 with strained-deformations. In one propulsion embodiment, two or more composite fins 60 are each coupled to two or more transmission assemblies 13, 13a, 13b powered by motors that are coupled to a common member 10, to create a vehicle capable of "skating" over ice, FIG. 33. A central controller 12 and battery 11 or other power source to power the transmission assemblies 13a, 13b and may be located inside the common member 10.

Figure 34:
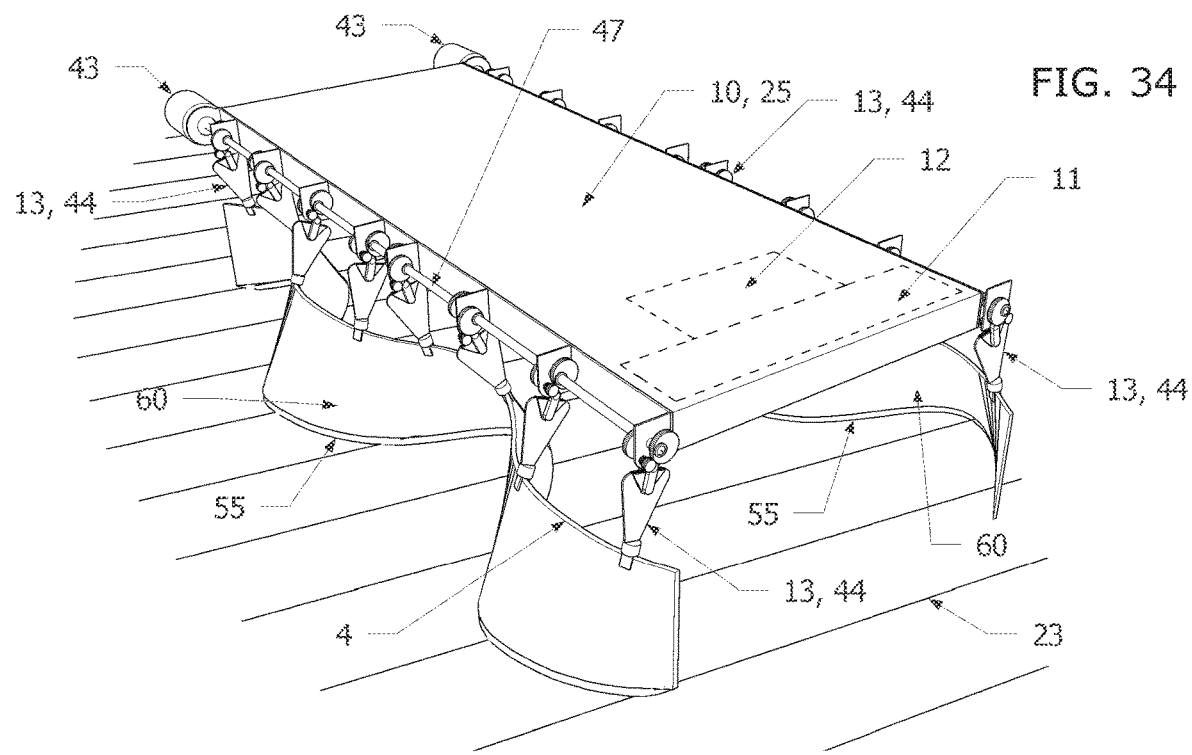
FIG. 34 shows an implementation of a shaft with conjugate cams for each composite fin in one embodiment.

In another embodiment, two or more composite fins 60 are each coupled to two or more transmission assemblies 13, 44 that are coupled to a common member 10, 25 to yield a vehicle that can skate over ice. The transmission assemblies 13, 44 of each fin may be actuated by a motor 43 that operates a crank shaft, Scotch Yoke, cam shaft and/or the like. An example is shown in FIG. 34 using a shaft 47 with conjugate cams for each composite fin 60 whereby a central controller 12 and battery 11 or other power source power a motor for each composite fin 60, allowing independent control of the speed and direction of undulation-travel for each composite fin 60. Independent control of each composite fin 60 allows for direction change and maneuverability of the vehicle over the ice. In alternative implementations, a single motor and/or coupled control for both composite fins may be provided.

In another implementation, the vehicle may have two or more thrust modules, FIG. 35-36. The thrust module 62, 63 may comprise a crenated strip fin 3 coupled via transmission assemblies 13, 13a, 13b, 28, 44 to a common member 10. In one implementation, the common member 10 may incorporate a cam with a cam shaft 47 driven, e.g., by a single actuator 43 via a belt or gear and the like, to make a cam thrust module 62, FIG. 35, with a battery 11 or other power source and a central controller 12. The common member 10 may serve to secure a plurality of actuators 9 such as servo motors, to make a servo thrust module 63 FIG. 36, having a battery 11 or other power source and a central controller 12, e.g., for autonomous or remotely controlled operation.

In one vehicle implementation, a rotating roll actuator 64, such as an electric motor, is fixed to the common member 10 at either end of the thrust module 62, 63. The shaft, or other rotating component 65 of the first roll actuator 64 is fixed to one end of a flexible coupling member 66. The shaft, or other rotating component 65 of a second roll actuator 64 is fixed to the other end of the flexible coupling member 66, FIG. 37. The first and second thrust modules 62, 63 of the vehicle may therefore, in one implementation, be elastically coupled to each other via the flexible coupling members 66 and via the rotating components 65 of the roll actuators 64. The central controllers 12 of the thrust modules 62, 63 may communicate with each other through a wired or wireless connection. Each roll actuator 64 may rotate independently of the other roll actuators 64 under the control of the central controllers 12.

Traveling wave undulations of the fins are induced by the actuators of the thrust modules 62, 63. For example, the primary thrust vector of a thrust module 62,63 induced by traveling wave actuation along the fin 3 may create force in the direction substantially opposite to the traveling wave and substantially parallel to the longitudinal axis of the thrust module 62, 63. A secondary and lesser thrust vector of a thrust module 62, 63 may be perpendicular to the longitudinal axis of the thrust module 62, 63.

Figure 38:
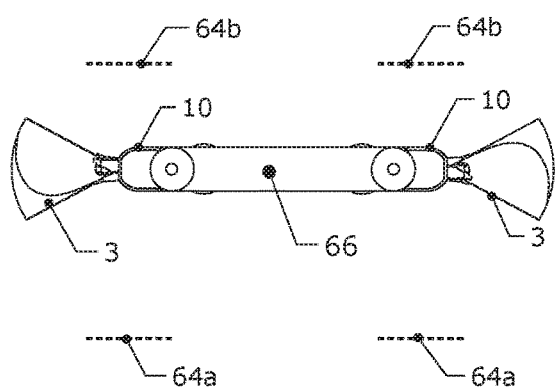
FIGS. 38-39 show views of an implementation of coupled thrust modules in a default operating position in one embodiment.
Figure 39:
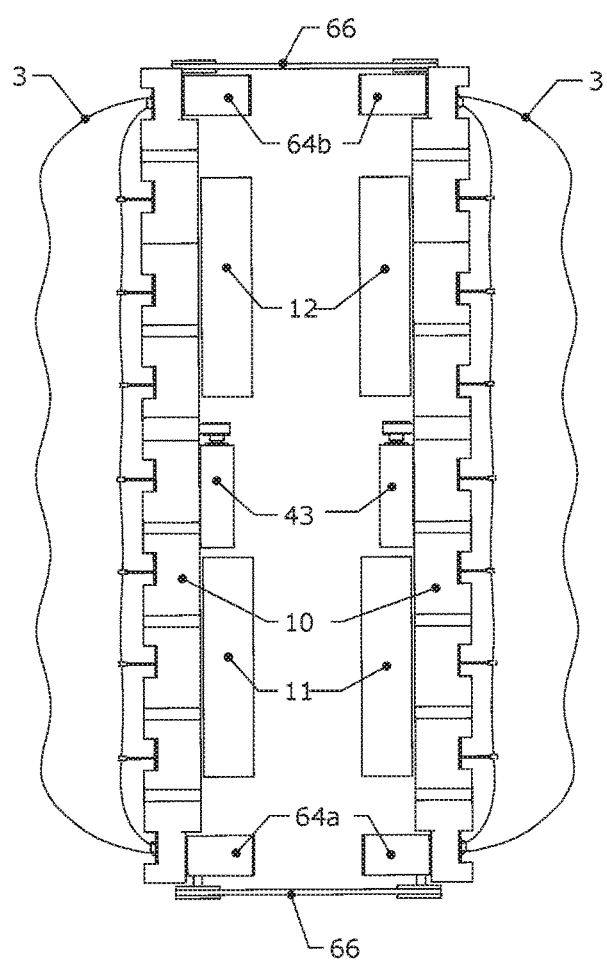

In one implementation, the vehicle's default operating position may be one in which the fins 3 are in an overall horizontal position, the thrust modules 62, 63 are substantially parallel to each other, and the flexible coupling members 66 are substantially parallel to each other. FIG. 38 shows this default operating position looking at the front of the vehicle, and FIG. 39 shows this default position viewing the vehicle from above, in this default position, the vehicle may travel in a straight line when the traveling modulations of the fins 3 travel in the same direction. The dotted lines shown in FIG. 38 represent the positions of the front roll actuators 64a relative to the flexible coupling member 66, and represents positions of the rear roll actuators 64b relative to the flexible coupling member 66.

In various implementations and/or modes of operation, a variety of fin 3 tilt and fin 3 rotation positions may be implemented and/or achieved, creating a variety of thrust vector forces on the vehicle. Actuation of one or more of the vehicle's roll actuators 64 allows the thrust modules 62, 63 to tilt relative to each other so that the primary thrust vector of the two thrust modules 62, 63 are no longer parallel, causing the vehicle to roll and/or to change direction.

Figure 40:
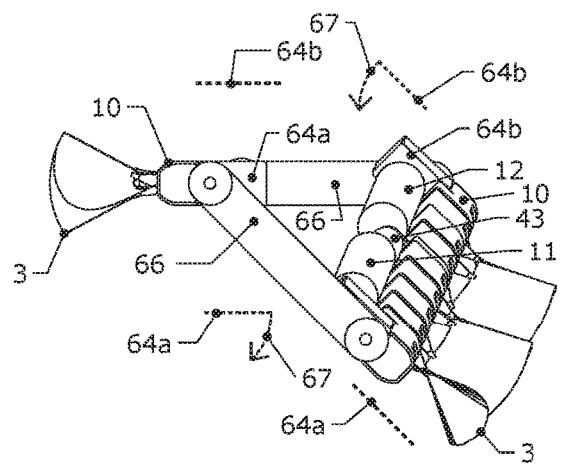
FIGS. 40-41 show views of an implementation of coupled thrust modules in another operating position in one embodiment.
Figure 41:
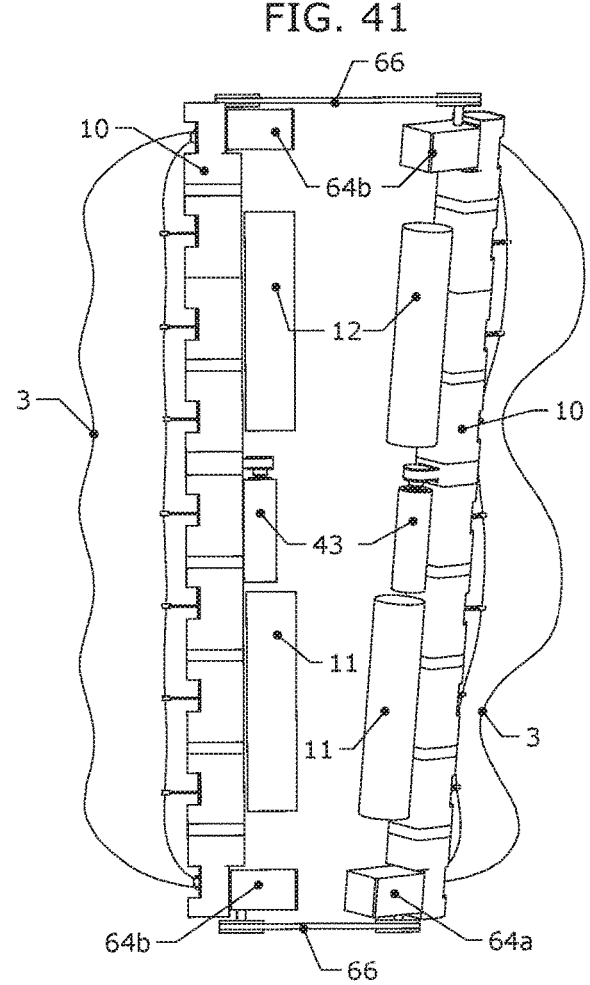

One example is shown in FIG. 40, which is a view looking at the front of the vehicle in a position where the rotating component 65 of the left front roll actuator 64a has rotated 67 the flexible coupling member 66 to which it is fixed forty-five degrees relative to itself, and the rotating component 65 of the rear left roll actuator 64b has rotated the flexible coupling member 66 to which it is fixed zero degrees relative to itself. The rotating component 65 of the right rear roll actuator 64b has rotated 67 the flexible coupling member 66 to which it is fixed forty-five degrees relative to itself, and the rotating component 65 of the front right roll actuator 64a has rotated the flexible coupling member 66 to which it is fixed zero degrees relative to itself. FIG. 41 shows the same configuration as FIG. 40 when viewing the vehicle from above.

Figure 42:
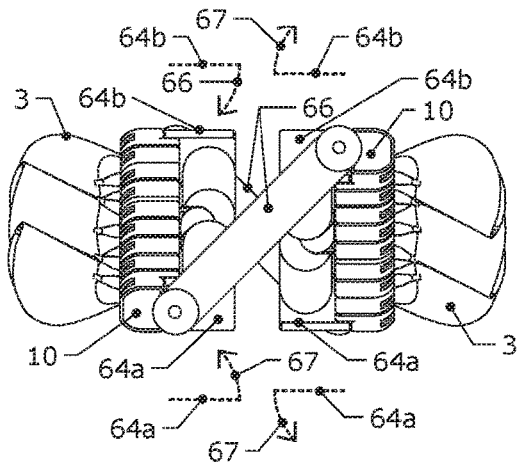
FIG. 42-43 show views of an implementation of coupled thrust modules in another operating position in one embodiment.
Figure 43:
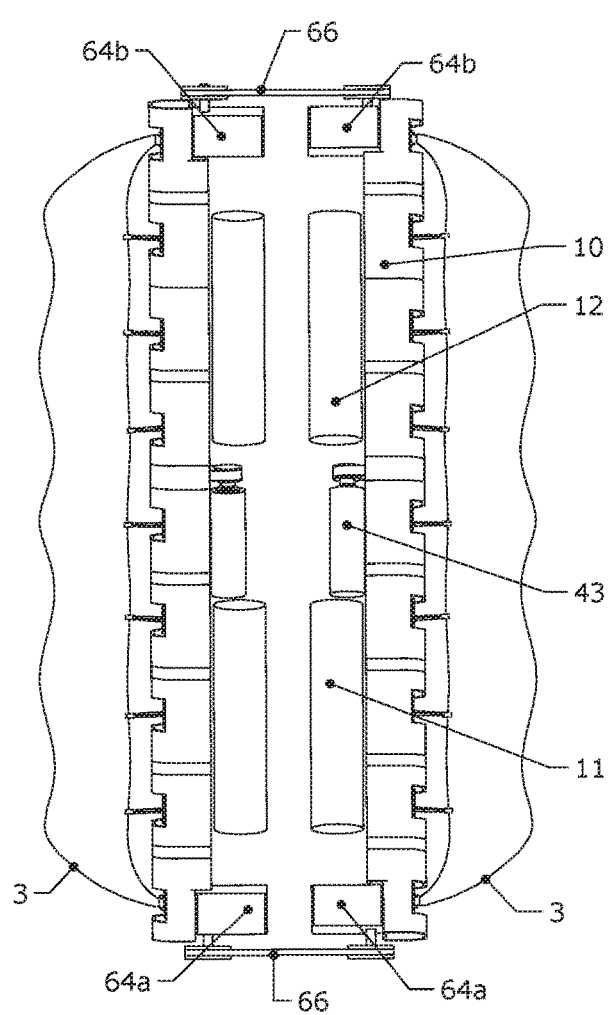

Another example is shown in FIG. 42, where a view looking at the front of the vehicle is shown in which the rotating component 65 of the front left roll actuator 64a has rotated 67 the flexible coupling component 66 to which it is fixed counter-clockwise forty-five degrees relative to itself, and the rotating component 65 of the right front roll actuator 64a has rotated 67 the flexible coupling component 66 to which it is fixed counter-clockwise forty-five degrees relative to itself. The rotating component 65 of the left rear roll actuator 64b has rotated 67 the flexible coupling component 66 to which it is attached clockwise forty-five degrees relative to itself, and the rotating component of the rear right roll actuator 64b has rotated 67 the flexible coupling component 66 to which it is fixed clockwise forty-five degrees relative to itself. FIG. 43 shows the same positioning of roll actuators 64 viewing the vehicle from above. In this example, the thrust vector of the left thrust module 62 is angled down while the thrust vector of the right thrust module 62 is angled up.

Figure 44:
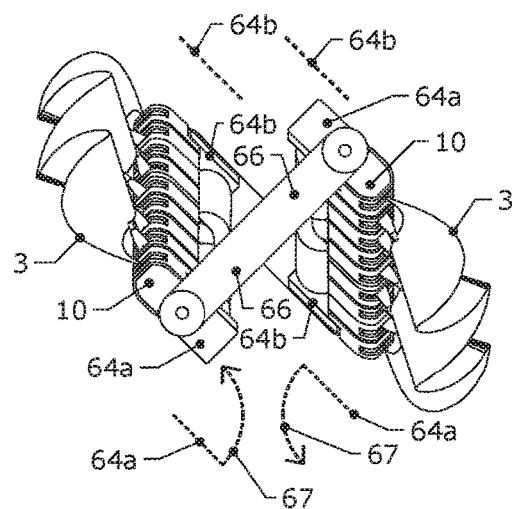
FIG. 44-45 show views of an implementation of coupled thrust modules in another operating position in one embodiment.
Figure 45:
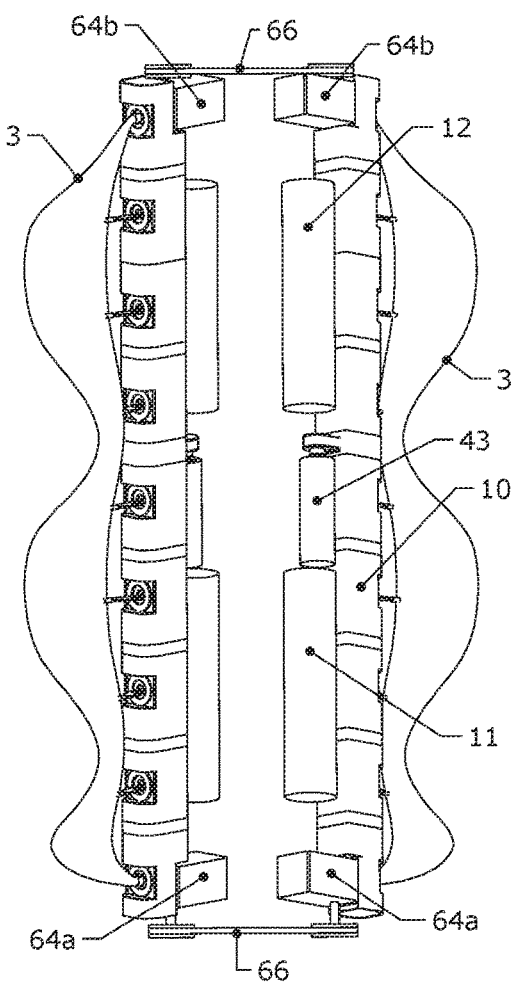

Another example is shown in FIG. 44, where a view looking at the front of the vehicle is shown in a position where the rotating component 65 of the front left roll actuator 64a has rotated 67 the flexible coupling component 66 to which it is fixed ninety degrees counter-clockwise relative to itself, and the rotating component 65 of the front right roll actuator 64a has rotated 67 the flexible coupling component 66 to which it is fixed ninety degrees counter-clockwise relative to itself. The rotating components 65 of both the left and right rear roll actuators 64b have rotated the coupling component 66 to which they are fixed zero degrees relative to themselves. In this example, the primary thrust vectors of the thrust modules 62 are tilted upwards and downwards relative to each other as well as inwards towards the central longitudinal axis of the vehicle. FIG. 45 shows the same positioning of roll actuators 64 viewing the vehicle from above.

When one or more roll actuators 64 has caused a thrust module 62, 63 to tilt, the distance as measured horizontally between the front and rear roll actuators 64 is reduced and the flexible coupling components 66 are now out of plane, having been induced to bend and twist, and the faces of the flexible coupling components 66 are no longer parallel to each other. The flexible nature of the flexible coupling components 66 allows out-of-plane bending while substantially resisting in-plane bending due to their aspect ratios.

Figure 46:
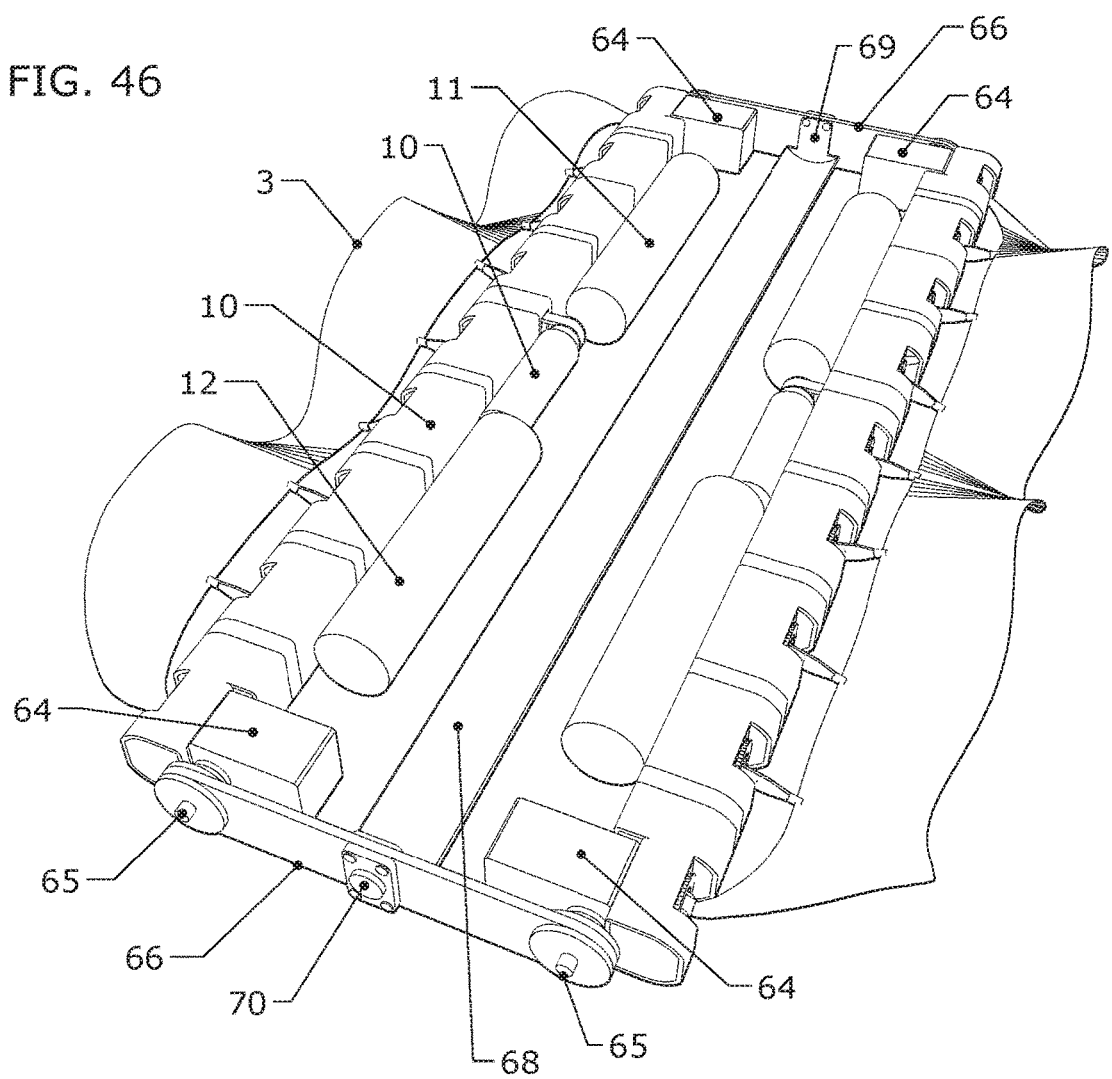
FIG. 46 shows an implementation of coupled thrust modules with secondary chassis in one embodiment.

In another implementation, the two flexible coupling components 66 may be connected via a secondary chassis 68, which may be rigid or semi-rigid, onto which one or more vehicle payloads may be attached, FIG. 46. In one implementation, one end of the secondary chassis 68 may be rigidly fixed 69 to the first flexible coupling component 66 while the other end may be rotationally coupled to the second flexible coupling component 66, e.g., via a shaft and bearing 70 or other component allowing one degree of rotational freedom.

Figure 47:
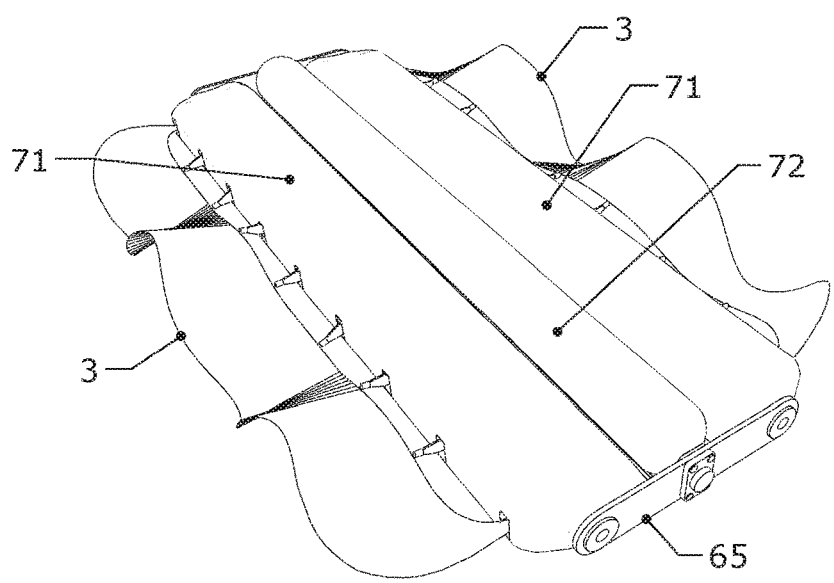
FIG. 47 shows an implementation of coupled thrust modules with cowlings and vehicle payload in one embodiment.

FIG. 47 illustrates an implementation with cowlings 71 enclosing the thrust modules 62, 63 and shows a payload 72 attached to the secondary chassis 68.

The high maneuverability of the vehicle, may result from various factors in various implementations. For example, these may include a fast and/or near-instantaneous thrust induced by the fins 3 due to their large surface areas, the ability of the fins 3 to induce drag vectoring in addition to thrust vectoring, and/or the roll actuators that allow the fins 3 to tilt and rotate relative to the longitudinal axis of the vehicle.

Figure 48:
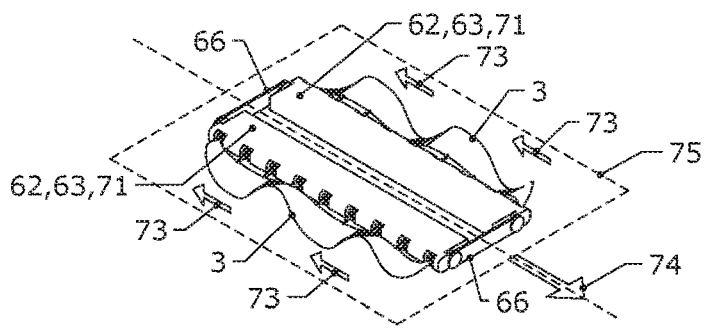
FIGS. 48-52 show an implementation of vehicle position and orientation change in one embodiment.

An example of rapid position and orientation change and mobility in this implementation is shown in the sequence of FIGS. 48-52. In FIG. 48, the roll actuators 64 are in one implementation of a default position and the direction of fin undulation travel 73 is directly backwards, causing the vehicle motion 74 to be directly forwards. The horizontal plane 75 is shown as a dotted line in FIGS. 48-52 as a reference plane to show how the vehicle's position and movement has changed through the sequence.

Figure 49:
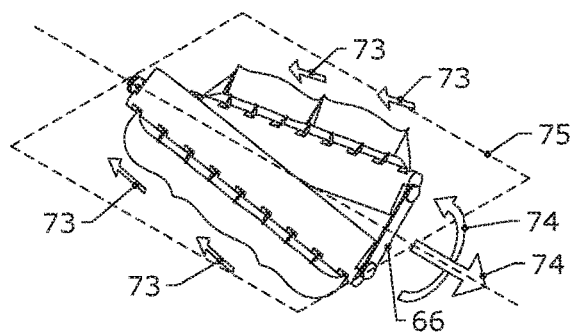
Figure 50:
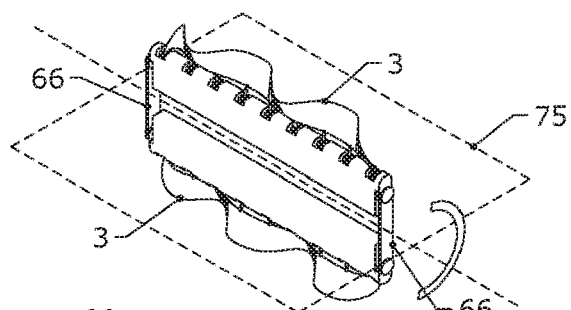
Figure 51:
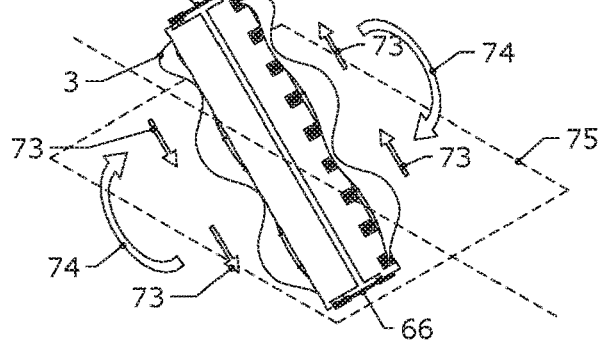
Figure 52:
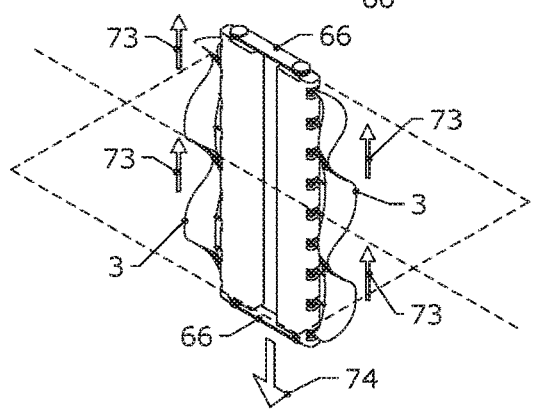

In FIG. 49, the roll actuators 64 have caused the thrust modules 62,63 to tilt in opposite directions, as shown for example in FIGS. 44-45, so that the thrust vector of one fin is partially upwards while the thrust vector of the other fin is partially downwards. This causes the vehicle motion 74 to include a rotational component about the vehicle's longitudinal axis (e.g., a roll) as it travels forwards. FIG. 50 shows the vehicle after this rotation about the vehicle's longitudinal axis has caused the horizontal plane of the vehicle to rotate 90 degrees, and the roll actuators 64 are back to their default position. In FIG. 51, the undulation 73 of the upper fin 3 is traveling backwards while the undulation 73 of the lower fin is traveling forwards, causing the vehicle motion 74 to include a rotational about a transverse axis of the vehicle (e.g., a yaw). In FIG. 52, the vehicle has completed 90 degrees of this rotation, and the undulation 73 of both fins travels backwards (which is now upwards in the figure), causing the vehicle motion 74 to be directly downwards. In this manner, in accordance with the described implementation, a vehicle traveling horizontally forwards can quickly roll and dive directly downwards.

In order to address various issues and advance the art, the entirety of this application for VEHICLE WITH TRAVELING WAVE THRUST MODULE APPARATUSES, METHODS AND SYSTEMS (including the Cover Page, Title Headings, Field, Background, Summary, Brief Description of the Drawings, Detailed Description, Claims, Abstract, Figures, Appendices, and otherwise) shows, by way of illustration, various embodiments in which the claimed innovations may be made, configured, and/or practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any process steps and/or feature sets as described in the figures and/or throughout are not limited to a fixed operating order and/or arrangement, but rather, any disclosed order is exemplary and all equivalents, regardless of order, are contemplated by the disclosure. Similarly, some features are applicable to one aspect of the innovations, and inapplicable to others. In addition, the disclosure includes multiple innovations including some that may not be presently claimed, and the Applicant reserves all rights in those presently unclaimed innovations including the right to claim such innovations, file additional applications, continuations, continuations in part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims.

What is claimed is:

1. An apparatus, comprising:
a first thrust module comprising a first crenated strip coupled via at least one first transmission assembly to a first common member;
a second thrust module comprising a second crenated strip coupled via at least one second transmission assembly to a second common member;
a first elastic coupling member;
a second elastic coupling member;
a first roll actuator coupled at a front end of the first common member to a first end of the first elastic coupling member;
a second roll actuator coupled at a front end of the second common member to a second end of the first elastic coupling member;
a third roll actuator coupled at a back end of the first common member to a first end of the second elastic coupling member; and
a fourth roll actuator coupled at a back end of the second common member to a second end of the second elastic coupling member.

2. The apparatus of claim 1, wherein the first thrust module comprises a first cam, coupled to the at least one first transmission assembly, with a first cam shaft driven by a first actuator, and wherein the second thrust module comprises a second cam, coupled to the at least one second transmission assembly, with a second cam shaft driven by a second actuator.

3. The apparatus of claim 2, wherein the first cam shaft is coupled to the first actuator by at least one first belt, and the second cam shaft is coupled to the second actuator by at least one second belt.

4. The apparatus of claim 2, wherein the first cam shaft is coupled to the first actuator by at least one first gear, and the second cam shaft is coupled to the second actuator by at least one second gear.

5. The apparatus of claim 1, wherein the first thrust module comprises a first plurality of actuators coupled to the at least one first transmission assembly, and wherein the second thrust module comprises a second plurality of actuators coupled to the at least one second transmission assembly.

6. The apparatus of claim 5, wherein the first and second plurality of actuators comprise a first and second plurality of servo motors.

7. The apparatus of claim 1, further comprising:
at least one power source configured to power the first, second, third and fourth roll actuators.

8. The apparatus of claim 7, wherein the at least one power source comprises a battery.

9. The apparatus of claim 1, further comprising:
at least one central controller.

10. The apparatus of claim 9, wherein the at least one central controller comprises a first central controller coupled to the first and third roll actuators and a second central controller coupled to the second and fourth roll actuators.

11. The apparatus of claim 10, wherein the first central controller is located inside the first common member and the second central controller is located inside the second common member.

12. The apparatus of claim 1, further comprising:
a first arched blade affixed to an edge of the first crenated strip; and
a second arched blade affixed to an edge of the second crenated strip.

13. The apparatus of claim 1, further comprising:
a first cowling enclosing the first thrust module, and
a second cowling enclosing the second thrust module.

14. The apparatus of claim 1, further comprising:
at least one chassis connecting the first elastic coupling member to the second elastic coupling member.

15. The apparatus of claim 14, wherein the at least one chassis is rigid.

16. The apparatus of claim 14, wherein the at least one chassis is semi-rigid.

17. The apparatus of claim 14, wherein the at least one chassis is rigidly fixed to the first elastic coupling member and rotationally coupled to the second elastic coupling member.

18. The apparatus of claim 14, further comprising:
at least one vehicle payload attached to the at least one chassis.

19. The apparatus of claim 1, wherein the at least one first transmission assembly allows three degrees of freedom of motion for the first crenated strip relative to the first common member and the at least one second transmission assembly allows three degrees of freedom of motion for the second crenated strip relative to the second common member.

20. An apparatus, comprising:
a first thrust module comprising a first crenated strip coupled via at least one first transmission assembly to a first common member;
a second thrust module comprising a second crenated strip coupled via at least one second transmission assembly to a second common member;
a first elastic coupling member;
a second elastic coupling member;
a first roll actuator coupled at a front end of the first common member to a first end of the first elastic coupling member;
a second roll actuator coupled at a front end of the second common member to a second end of the first elastic coupling member;
a third roll actuator coupled at a back end of the first common member to a first end of the second elastic coupling member;
a fourth roll actuator coupled at a back end of the second common member to a second end of the second elastic coupling member;
at least one battery configured to power the first, second, third and fourth roll actuators;
a first central controller coupled to the first and third roll actuators and located inside the first common member;
a second central controller coupled to the second and fourth roll actuators and located inside the second common member;
at least one chassis connecting the first elastic coupling member to the second elastic coupling member; and
at least one vehicle payload attached to the at least one chassis.

21. A vehicle comprising:
two undulating thrust modules joined together at their front ends with a front flexible coupling member and at their rear ends with a rear flexible coupling member,
wherein the front and rear flexible coupling members are connected to the two thrust modules via a total of four actuated rotational couplings each having one degree of rotational freedom.

22. A vehicle comprising:
a first undulating thrust module and a second undulating thrust module,
wherein front ends of the first and second thrust modules are joined together by a first flexible coupling member via two front actuated rotational couplings, and
wherein the rear ends of the first and second thrust modules are joined together by a second flexible coupling member via two rear actuated rotational couplings,
wherein each of the two front rotational couplings and two rear rotational couplings have one degree of rotational freedom and are actuated by electric motors.

23. The vehicle of claim 22, wherein undulating action of each of the first and second undulating thrust modules is induced by a cam and motor coupled to a common member and powered by a battery under control of a central controller.

24. The vehicle of claim 22 wherein undulating action of each of the first and second undulating thrust modules is induced by multiple motors fixed to a common member and powered by a battery under control of a central controller.

* * * * *